US011598986B2

(12) United States Patent
Mondiot

(10) Patent No.: US 11,598,986 B2

(45) Date of Patent: Mar. 7, 2023

(54) ELECTRICALLY CONTROLLABLE DEVICE HAVING VARIABLE DIFFUSION BY LIQUID CRYSTALS, AND METHOD FOR SAME

(71) Applicant: SAINT-GOBAIN GLASS FRANCE, Courbevoie (FR)

(72) Inventor: Frédéric Mondiot, Antony (FR)

(73) Assignee: SAINT-GOBAIN GLASS FRANCE, Courbevoie (FR)

( * ) Notice: Subject to any disclaimer, the term of this patent is extended or adjusted under 35 U.S.C. 154(b) by 129 days.

(21) Appl. No.: 17/280,682

(22) PCT Filed: Sep. 27, 2019

(86) PCT No.: PCT/EP2019/076247
§ 371 (c)(1),
(2) Date: Mar. 26, 2021

(87) PCT Pub. No.: WO2020/065038
PCT Pub. Date: Apr. 2, 2020

(65) Prior Publication Data

US 2022/0004040 A1 Jan. 6, 2022

(30) Foreign Application Priority Data

Sep. 27, 2018 (FR) .................................... 1858901
Oct. 24, 2018 (FR) .................................... 1859816

(51) Int. Cl.
*G02F 1/1334* (2006.01)
*G02F 1/137* (2006.01)
(Continued)

(52) U.S. Cl.
CPC ...... *G02F 1/13345* (2021.01); *G02F 1/13731* (2013.01); *G02F 1/13775* (2021.01); *G02F 1/134309* (2013.01)

(58) Field of Classification Search
CPC ............ G02F 1/1333; G02F 1/133302; G02F 1/133305; G02F 1/1334; G02F 1/13345;
(Continued)

(56) References Cited

U.S. PATENT DOCUMENTS 5,437,811 A 8/1995 Doane et al.
5,691,795 A 11/1997 Doane et al.
(Continued)

FOREIGN PATENT DOCUMENTS

DE 10257711 A1 7/2003
EP 0 844 075 A1 5/1998
(Continued)

OTHER PUBLICATIONS

International Search Report as issued in International Patent Application No. PCT/EP2019/076247, dated Nov. 29, 2019.

*Primary Examiner* — Thoi V Duong
(74) *Attorney, Agent, or Firm* — Pillsbury Winthrop Shaw Pittman LLP

(57) ABSTRACT

A device having scattering which can be varied by liquid crystals includes a stack with a first electrode, an electroactive layer with the liquid crystals being stabilized by the polymeric network, a second electrode. The material exhibits, starting from a temperature referred to as T1, a mesophase referred to as P. At a temperature T' greater than or equal to T1, the stack is capable of exhibiting at least three variable scattering states, which are stable and reversible, in the visible region.

21 Claims, 14 Drawing Sheets

100 12' 11' 1' 10' 2' 20' 4' 5 3 5 4 2 1 10 11 12 110

Figure 1:
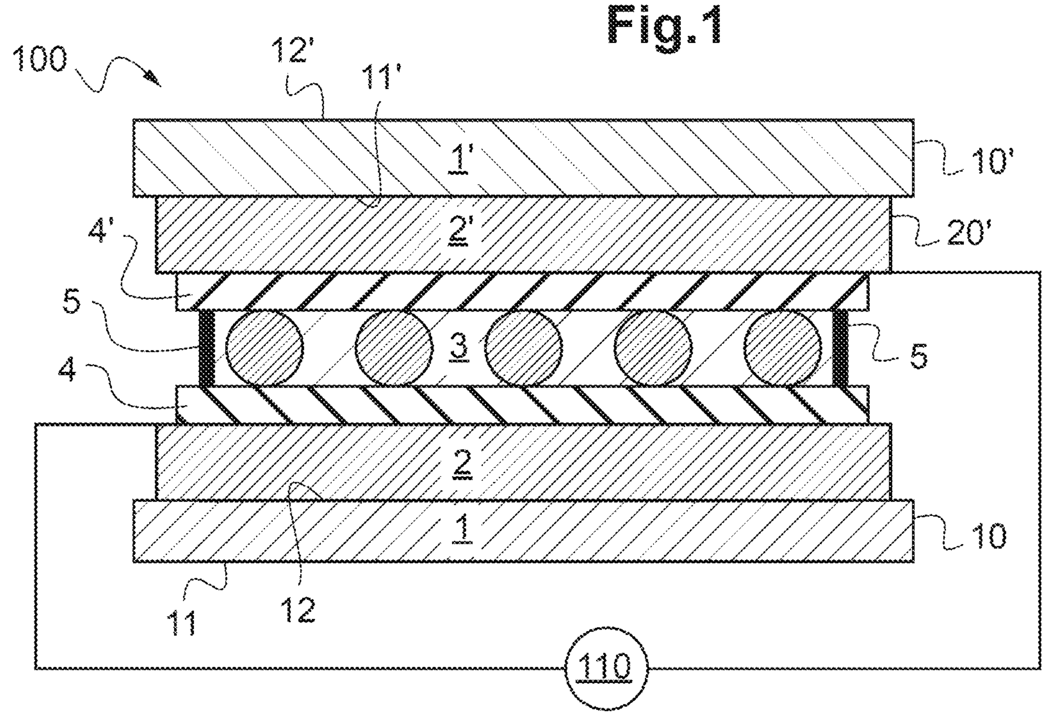

(51) Int. Cl.
*G02F 1/1343* (2006.01)
*G02F 1/1337* (2006.01)

(58) Field of Classification Search
CPC .... G02F 1/1337; G02F 1/137; G02F 1/13775; G02F 1/13787; G02F 1/1343; G02F 1/134309; G02F 1/13731
See application file for complete search history.

(56) References Cited

U.S. PATENT DOCUMENTS

| | | | |
|---|---|---|---|
| 6,674,504 B1 | 1/2004 | Li et al. | |
| 2004/0253439 A1 | 12/2004 | Martin et al. | |
| 2009/0290078 A1* | 11/2009 | Yang .................. | G02F 1/13718 349/35 |
| 2015/0029211 A1 | 1/2015 | Weber et al. | |

FOREIGN PATENT DOCUMENTS

| | | |
|---|---|---|
| EP | 1 653 275 A1 | 5/2006 |
| WO | WO 2004/025334 A2 | 3/2004 |
| WO | WO 2010/070606 A1 | 6/2010 |
| WO | WO 2010/136702 A1 | 12/2010 |
| WO | WO 2011/161391 A1 | 12/2011 |
| WO | WO 2014/072596 A1 | 5/2014 |

* cited by examiner 100
12'
11'
1'
10'
2'
20'
4'
5
3
5
4
2
1
10
11
12
110

31b
36
31b
Z
310
310
31
31
3
33
35
31a
34
35'

Z
Z
310

E
310
0
0

31b
36

31b
310
Z
310
Emax
33
31a

T(%)
100
90
80
70
60
50
40
30
20
10
0
400
450
500
550
600
650
700
750
800
λ(nm)
A
B
0V TT
0V DT
10V DT
10V TT
20V TT
20V DT
30V DT
30V TT
40V TT
40V DT
50V DT
50V TT
60V TT
60V DT
70V DT
70V TT
80V TT
80V DT
90V DT
90V TT
100V TT
100V DT
110V DT
110V TT
120V TT
120V TT
120V TT
120V TT

T(%)
100
90
80
70
60
50
40
30
20
10
0
400
800
1200
1600
2000
2400
λ(nm)
A
B
0V
10V
20V
30V
40V
50V
60V
70V
80V
90V
100V
110V
120V

H(%)
100
90
80
70
60
50
40
30
20
10
0
400
800
1200
1600
2000
2400
λ(nm)
0V
10V
20V
30V
40V
50V
60V
70V
80V
90V
100V
110V
120V

H
0.8
0.7
0.6
0.5
0.4
0.3
0.2
0.1
0
400
450
500
550
600
650
700
750
800
λ(nm)
0V
10V
20V
30V
40V
50V
60V
70V
80V
90V
100V
110V
120V 400
5
7
1'
2'
3
2
1
7'
60
4'
5
4

500
82'
81'

8'b
8'
72
70
1'
2'
4'
7b
5
3
5
4
2
7
1
7a
71
80
8
82
81

ELECTRICALLY CONTROLLABLE DEVICE HAVING VARIABLE DIFFUSION BY LIQUID CRYSTALS, AND METHOD FOR SAME

CROSS-REFERENCE TO RELATED APPLICATIONS

This application is the U.S. National Stage of PCT/EP2019/076247, filed Sep. 27, 2019, which in turn claims priority to French patent application number 1858901 filed Sep. 27, 2018 and French patent application number 1859816 filed Oct. 24, 2018. The content of these applications are incorporated herein by reference in their entireties.

The invention relates to an electrically controlled device having scattering which can be varied by liquid crystals, possessing a layer of liquid crystals between two electrodes, by application of an electric field.

Glazings are known for which certain characteristics can be modified under the effect of an appropriate electrical supply, very particularly the transmission, the absorption, the reflection in certain wavelengths of electromagnetic radiation, in particular in the visible region and/or in the infrared region, or else light scattering.

The electrically controllable glazing having liquid crystals can be used everywhere, both in the construction sector and in the automobile sector, each time that the view through the glazing has to be prevented at given moments.

Liquid crystal systems are known under the terms of "PDLC" (Polymer Dispersed Liquid Crystal), in the form of droplets of liquid crystals dispersed in a polymer matrix, or also "PSLC" (Polymer Stabilized Liquid Crystal), homogeneously distributed liquid crystals.

One object of the invention consists in developing an electrically controllable device having liquid crystals of PSLC type with improved electro-optical properties which in particular can be appropriately adjusted.

To this end, the present invention first provides an electrically controllable device having scattering which can be varied (flat or curved device, in particular flexible device) by liquid crystals comprising a stack of layers (air-filled cavity possibly included) in this order:

a first, preferably transparent, electrode which is in particular self-supporting (optionally flexible film) or preferably on a dielectric substrate which is preferably transparent (and optionally flexible), especially with a thickness of at most 1 cm, 5 mm, 3 mm or which is subcentimetric or especially a plastic film or thin or ultrathin (UTG) glass, film with a submillimetric thickness and even a thickness of at most 200 nm, first electrode comprising (indeed even consisting of) a first electrically conductive layer (monolayer or multilayer, especially deposits(s)), in particular an inorganic layer especially of at most 200 nm (on the first substrate), first electrode with a first main surface referred to as first bonding surface and a surface referred to as opposite surface Sb, in particular first electrode comprising a first means of conveying current (strip (bus bar), in particular metallic, made of copper with silver, and the like) along the edge of the first bonding surface a dielectric electroactive layer with a main face referred to as face A1 on the bonding surface side and a main face referred to as opposite face A2, the electroactive layer having a thickness $E_0$ which is submillimetric and even of at most 100 μm and of at least 50 nm, in particular of 50 nm to 50 μm and even of 100 nm to 20 μm and better still of at least 1 μm or 5 μm, electroactive layer made of a material, in particular thermotropic (preferably) and/or lyotropic, containing (indeed even consisting of):

liquid crystals (in particular thermotropic and/or lyotropic) which are preferably predominant by weight in the material (preferably at least 50%, 70%, 80%, 85% by weight of said liquid crystals), in particular liquid crystals preferably comprising mesogens (for example without polymer chain) or at least mesogenic groups incorporated in a main or side chain of a polymer ("LOP" family), especially liquid crystals which are submillimetric in size and even of at most 100 nm (and less than $E_0$, for example with a length L with $E_0/L>10$ or 100), especially a mixture of several liquid crystals (pure, in the non-LCP sense) (two or more), preferably one of the liquid crystals of which (preferably predominant by weight) exhibits another mesophase P' closer to (or even adjacent to) the crystalline phase (nematic, for example, or non-smectic, in particular non-smectic A)

polymers forming a (three-dimensionnel) polymeric network, the liquid crystals being (physically) stabilized by the polymeric network (that is to say, of the PSLC family), preferably with at most 20%, 15%, 10%, 5% by weight of polymer (or polymers and polymer precursors)

optionally precursors of (said) polymers or also non-crosslinked polymers preferably spacers, in particular with a height (and even with greatest dimension) of less than or equal to $E_0$, at the periphery (which are dielectric, transparent or nontransparent, optionally masked by a frame, for example made of Mylar, and the like) and/or dispersed in the electroactive layer (which are dielectric, transparent, in particular plastic, glass, silica, preferably subcentimetric, in particular beads)

optionally additives, such as particles and preferably uncharged particles (without anions, cations), preferably with a height of less than or equal to $E_0$ (and even with greatest dimension less than or equal to $E_0$)

a second, preferably transparent, electrode which is in particular self-supporting (optionally flexible film) or preferably on a dielectric support which is preferably transparent, especially with a thickness of at most 1 cm, 5 mm, 3 mm or which is subcentimetric, especially a plastic film or made of thin or ultrathin (UTG) glass, film with a submillimetric thickness and even a thickness of at most 200 nm, in particular second electrode comprising (indeed even consisting of) a second electrically conductive layer (monolayer or multilayer, especially deposits(s)), in particular an inorganic layer especially of at most 200 nm (on the support), second electrode with on the side of face A2 a main surface referred to as second bonding surface and with an opposite surface Sc, in particular second electrode comprising a second means of conveying current (strip, in particular metallic, bus bar) along the edge of the second bonding surface and better still opposite the first means of conveying current.

In the transparent state, the electroactive layer is visible by transparency on the side of the first electrode and/or on the side of the second electrode, preferably on both sides. Preferably, the electroactive layer is sealed at the periphery by a dielectric seal, in particular polymeric seal (along the edge of the first and second bonding surfaces, in contact with the material based on crystals or separated by a peripheral spacer).

In addition, the material exhibits a mesophase referred to as P, starting from a temperature referred to as T1 (and below a temperature referred to as Tf which can be the isotropic phase transition temperature), preferably T1 of at most 120° C., 90° C., 50° C., 40° C. and better still of at least 10° C., 20° C., and better still in a temperature range of at least 5° C., 10° C., in which especially the material comprises (by volume, in the thickness generally) an assembly of domains (containing the liquid crystals stabilized by the polymeric network), and even is essentially divided into said domains or elements of volumes, the domains extending preferably between the first and second electrodes at least over a fraction of the thickness $E_0$, and the domains comprising two-dimensional topological defects, especially line defects, in particular at least two forms of line defects (for example one elliptical (circle included), the other straight or curved line, hyperbola, and the like).

At a temperature T' greater than or equal to T1, the material being in the mesophase P, the stack (or the device (by virtue of the stack)) is capable of exhibiting at least three (stable) switchable states of scattering (switchable between one another, thus one of the three states switchable toward another of the three states and reversibly) for at least one wavelength of the visible region (for example at a value between 380 and 780 nm or 800 nm, in particular 550 nm, and even from 380 to 780 nm or 800 nm), indeed even for at least one wavelength of the near infrared region (for example at a value between 800 nm and 2.5 μm, even from 800 nm to 2.5 μm).

The first state is the most scattering, in particular defined by a nonzero haze H0 or a nonzero diffuse transmission DT0.

The second state is less scattering than the first state and is preferably defined by a haze H1 which is lower than H0 (or a diffuse transmission DT1 which is lower than DT0) and nonzero.

The third state, which is transparent or less scattering than the second state, is in particular defined by a haze H2 which is lower than H1 (or a diffuse transmission DT2 which is lower than DT1).

At least two of the three states are obtained by the application of an electric field (alternating or direct, preferably normal to the face A1) between the first and second electrodes.

The switching is reversible. The three states are reversible and even stable.

Until now, it was possible to obtain, with a layer of PSLC in the nematic state, only two stable and reversible states:

one scattering (in the OFF state)

and the other a transparent state by an alignment of the liquid crystals parallel to the electric field applied (the ON state), starting from a threshold value necessary to overcome the restoring force of the liquid crystals.

Furthermore, in the devices conventionally manufactured, when an electric field is applied in smectic mesophase, there are no reversible switchings.

According to the invention, the polymeric network and also the formation of the domains with two-dimensional defects makes it possible in particular for the liquid crystals to become oriented and also to stabilize in a multitude of intermediate positions between the most scattering state and the most transparent state and also to bring about a sudden change in direction (of "light switch" type).

Depending on the applications, it is possible to use the invention between a transparent state and several scattering states or even between two or more scattering states.

A microscopic explanation is that, starting from T1, in the presence of the mesophase P, at least a fraction of the liquid crystals are mobile and capable of becoming oriented according to three positions, generating the three stable states, the passage from one state to the other being reversible. More broadly, at least a fraction of the liquid crystals are mobile and capable of becoming oriented according to a multitude of positions, generating a multitude of stable states, the passage from one state to the other being reversible.

In the present text, P or P' are mesophases which, by definition, differ from a crystalline phase or from an isotropic phase. Applied to P or P', the term phase more specifically means mesophase.

The results are similar whether the electric field (normal to the face A1) is alternating or direct over the voltage range 0-120V and the frequency range 50 Hz-1 kHz.

The changes in orientations are preferably brought about by application of an electric field normal to the face A1 (in the mean plane if the stack is curved, for example flexible, and between bent substrates, in particular of glass).

Preferably, the relaxation time from one state to the other is at most 1 s or less.

It is possible in particular to pass from a scattering state to the transparent state (in all or part of the visible region) by passing from 0V to any nonzero value, in particular up to 220V or 120V and even at most 100V or 80V.

The level of scattering can be managed, in particular adjusted as a function of data gathered by sensors (temperature, luminosity, and the like) in communication with the device (controlling the electrical supply source).

It is also possible to design a switchable mirror with a variation in haze (first or second reflecting layer or also addition of a mirror layer or of an additional mirror).

It is possible to custom tint one or more of the elements of the device (electrode, anchoring layer, substrate or support, lamination interlayer, counterpane, and the like).

The invention relies preferably first on the existence of topological defects which are 2D.

Advantageously, the first state (the most scattering) is accessible in the absence of said applied electric field (applied normal to the face A1), the second and third states are accessible in the presence of said applied electric field, the second state being obtained for a voltage V1 and the third state being obtained for a voltage V2 which is greater than V1, in particular with at least a difference between V2 and V1 of 5V, 10V, 20V.

For example, V1 is between 5V and 30V and V2 is between 30V and 120V.

More broadly, the haze can be produced (in the visible region) as soon as the amplitude of the field/the voltage V is varied, each haze being, for example, defined as the ratio of the diffuse transmission DT to the total transmission TT. It is preferably expressed in %.

Thus, the stack (and even the device) exhibits a haze (and/or a diffuse transmission) which varies with the voltage in all or part of a range between 5V and 120V or 220V (for example between 10V and 50V) and even starting from 0.1V or 1V, at least at a reference wavelength such as 550 nm or between 500 nm and 600 nm or even over the wavelength range in the visible region 400-800 nm, with preferably (in particular with a thickness $E_0$ of electroactive layer of at most 12 μm):

H2/H1 (and/or DT2/DT1) of at most 99% and even 94% at a reference length such as 550 nm or even over the wavelength range 400-800 nm for V1 at 10V and V2 at 40V and in direct mode H2/H1 (and/or DT2/DT1) of at most 98% (and even at most 90% or 80% or 67%) at a reference wavelength such as 550 nm or even over the wavelength range 400-800 nm for V1 at 20V and V2 at 70V and in direct mode H2/H1 (and/or DT2/DT1) of at most 97% (and even at most 70% or 47%) at a reference wavelength such as 550 nm or even over the wavelength range 500-700 nm or even 400-800 nm for V1 at 20V and V2 at 100V and in direct mode H1/H0 (and/or DT1/DT0) of at most 99% (and even at most 98%) at a reference wavelength such as 550 nm or even over the wavelength range 500-700 nm or even 400-800 nm for V1 at 10V H1/H0 of at most 98% (and even 97%) at 550 nm or even over the wavelength range 500-700 nm or even 400-800 nm for V1 at 20V.

In particular in the case of non-TFCD domains (domains of non-TFCD type):

H2/H1 (and/or DT2/DT1) of at most 99% (and even at most 75% or 69%) at a reference wavelength such as 550 nm or even over the wavelength range 500-700 nm or even 400-800 nm for V1 at 10V and V2 at 40V and in direct mode H2/H1 (and/or DT2/DT1) of at most 98% (and even at most 60% or 59%) at a reference wavelength such as 550 nm or even over the wavelength range 500-700 nm or even 400-800 nm for V1 at 20V and V2 at 70V and in direct mode H2/H1 (and/or DT2/DT1) of at most 97% (and even at most 55% or 46%) at a reference wavelength such as 550 nm or even over the wavelength range 500-700 nm or even 400-800 nm for V1 at 20V and V2 at 100V and in direct mode H1/H0 (and/or DT1/DT0) of at most 99% (and even at most 92%) at a reference wavelength such as 550 nm or even over the wavelength range 500-700 nm or even 400-800 nm for V1 of 10V H1/H0 (and/or DT1/DT0) of at most 98% (and even at most 90% or 80%) for V1 at 20V.

The haze H0, H1 or H2 (and any other haze value) is preferably defined as the ratio of the diffuse transmission DT to the total transmission TT (at the temperature T').

At T', the haze can be measured by placing the device according to the invention against a circular inlet window with a radius equal to 10 mm of an integrating sphere with a diameter equal to 150 mm and coated internally with a material known as Spectralon, which is a fluoropolymer of PTFE type manufactured by Labsphere. For example, T'=T1+at least 5° C. is chosen.

The integrating sphere comprises an outlet window made of Spectralon, diametrically opposite the inlet window, which is circular and with a radius equal to 10 mm.

The total transmission is, for its part, measured with the outlet window of the integrating sphere.

The diffuse transmission is, for its part, measured by removing the outlet window of the integrating sphere.

Each wavelength is sent with an intensity I0 to the device (beam normal to the device) in front of said integrating sphere.

At T', it is possible to measure the total transmission or the diffuse transmission when the electric field is applied (with a voltage which can vary with a step of 10V, for example).

The signal received (I_TT or I_DT) is then compared with IO in order to deduce the transmissions thereof.

The value of the haze (of DT) can vary as a function of the size or of the type of two-dimensional defects, of their density, of the thickness of the electroactive material, of the choice of the liquid crystals, of the polymer network (degree of crosslinking, polymerization condition).

It is possible to measure in the same way in the infrared region.

The total transmission TT can, for its part, be fairly constant (independent of the electric field applied), in particular at least 70% in the visible region when the first and second electrodes are transparent, and also their optional substrate and support (and also the anchoring layers), especially nontinted substrate and support.

The stack (and even the device) especially exhibits a total transmission TT (measured as defined above):

of at least 5%, 10% or also of at least 70% and even of at least 75% at 550 nm and even from 500 to 600 nm or to 780 nm, and/or with a difference between the maximum total transmission TTmax and the minimum total transmission TTmin of at most 5% from 500 to 600 nm and even from 500 to 780 nm, and the total transmission TT' under said electric field (whatever the voltage V, in particular V between 5V and 120V) can be such that TT'-TT is less than 2% at 550 nm and even from 500 to 600 nm or 780 nm and even a difference between the maximum total transmission under field TT'max and the minimum total transmission TT'min (under an electric field) is of at most 5% from 500 to 600 nm and even 780 nm, in particular over an electric voltage range between 10V and 50V and even 5V and 120V.

Likewise, the stack (and even the device) exhibits a total transmission TT (without electric field) (measured as defined above):

of at least 5%, 10% or also of at least 70% and even of at least 75% at 550 nm and/or even in the near infrared region from 800 nm to 1200 nm or to 1500 nm, and/or with a difference between the maximum total transmission TTmax and the minimum total transmission TTmin of at most 5% from 800 nm to 1200 nm or to 1500 nm, and the total transmission TT' under said electric field (whatever the voltage V) can be such that TT'-TT is less than 2% at 900 nm and even from 800 to 1500 nm and even a difference between the maximum total transmission under field TT'max and the minimum total transmission (under field) TT'min is at most 5% from 800 nm to 1200 nm or to 1500 nm.

At T', the material can exhibit several phases P, in particular nematic phases (for example non-twisted nematic or twisted nematic phase), each with defects of the phase P' (preferably smectic, in particular A).

It may be preferable for the material to exhibit just one mesophase P', especially smectic, in particular A, at a temperature of less than T'.

The phase P, for example nematic or non-smectic, in particular non-smectic A, may not intrinsically generate two-dimensional defects (of the mesophase P').

These defects are then produced in a mesophase P' closer to that of the crystal, such as the smectic phase, rendered immobile by a polymeric network, and preserved (more or less perfectly) in the phase P.

For example, said domains of the mesophase P are domains remaining from another mesophase P' and in particular the phase P is nematic, the phase P' is smectic and said defects of the mesophase P' are smectic defects.

It may be said in particular that the polymeric network preserves (is the imprint of) the organization and the orientation of the liquid crystals in phase P' (for example smectic) and thus orientates the liquid crystals in its turn in phase P (for example nematic) in order to form the domains with the defects (for example nematic).

Consequently, the electroactive layer may preferably still possess at least two mesophases P and P'. It is possible to determine the P to P' transition by differential scanning calorimetry or PLM.

The molecular order differs from one mesophase to another. The mesophases differ in the type and degree of self-organization of the molecules. The collective directional behavior depends on the nature and the structure of the mesogens.

The material can especially exhibit another mesophase P'; the mesophase P is more distant from the crystalline phase than the mesophase P' (optionally adjacent, thus which is the first mesophase); especially, the mesophase P is nematic.

The mesophase P preferably exhibits a lower positional order than a mesophase P' of the material; the liquid crystals are especially on average parallel to one another, that is to say with at least long-range spontaneous orientational order.

The mesophase P may exhibit (adopt) a structure in particular imposed by the polymeric network, substantially (comparable to) layers of liquid crystals with zones of curved layers of liquid crystals and optionally zones of flat layers of liquid crystals.

The mesophase P may be the furthest from that of the crystal, in particular with a lower solid order, with a lower degree of freedom than a mesophase closer to the crystal.

The mesophase P may be the closest to that of the isotropic liquid.

In addition, preferably, the material comprises a mesophase P' up to a temperature T'1 of less than or equal to T1, the change from the mesophase P' to the mesophase P being reversible, direct or indirect.

The two-dimensional defects can be formed by stresses imposed in phase P' by the use of anchoring layers or also by application of a low-frequency electric field.

One way of generating the defects is to vary the thickness $E_0$ at the time of the manufacture in phase P'.

In said mesophase P, the domains can have a broad size distribution which is submetric (in particular less than 10 cm), even subcentimetric and even submillimetric, especially micronic of 1 to 200 μm, indeed even submicronic and better still at least 50 nm.

It is possible to characterize the mesophase P especially by polarized light microscopy, referred to as PLM.

Advantageously, at T', without said electric field and/or under said electric field, the domains are characterized by polarized light optical microscopy, referred to as PLM (at a magnification of at least ×20, for example), each domain being defined on the image of said PLM by a surface referred to as apparent surface SD which can have an equivalent diameter which is submetric (in particular less than 10 cm), even subcentimetric and even submillimetric, especially micronic of 1-200 μm, indeed even submicronic and better still of at least 50 nm.

The apparent surface SD can include or correspond to the vertical projection of a closed line defect forming the base of the domain.

This apparent surface SD can be:

- irregular, close to an ellipse, to a circle, to a rectangle or square
- regular, such as an ellipse, a circle, a rectangle or square.

The density of domains can be at least 100 domains/mm$^2$ or even at least 1000 domains/mm$^2$, especially determined by the number of apparent surfaces SD.

For example, on the image, a rectangle of predefined dimensions is defined and the number of apparent surfaces SD is counted.

The arrangement of domains can be regular (periodical or pseudoperiodical), that is to say with a repetition of the domains.

The arrangement of domains and/or within the domains can be random and depends essentially on its method of manufacture.

There can be several sizes of apparent surfaces SD, for example at least two, or three.

The domains can have a degree of occupation of at least 2%, 10%, 50%, 70%, in particular measured by image processing in polarizing optical microscopy (said PLM) by the degree of occupation of the apparent surfaces SD.

A domain of apparent surface SD under a direct electric field, for example at 25V, can especially be defined.

On a PLM image, a domain with line defects can have a multilobal form (with a contrast in luminosity).

On a PLM image, a domain with defects of non-TFCD type can have four lobes analogous to a four-leaved clover.

On a PLM image, a domain with defects of non-TFCD type can have two lobes and the texture resemble a mesh of a jersey knit.

The equivalent diameter or width of the apparent surface SD can in particular be submillimetric and in particular between 1 and 200 μm.

On a PLM image, each domain of apparent surface SD can be delimited with a closed black (at least darker) line with a width Ln which is in particular of at most 5 μm and/or even of at most LD/10 or LD/20.

Furthermore, the electroactive layer can be devoid of charged particles (ions, cations) with a flow under said electric field.

It is known that a layer of liquid crystals can be organized in columns with discotic liquid crystals in particular. Among columnar structures, the "spherical" or mosaic texture and their combinations are known.

In the mesophase P, the electroactive layer can be structured, in columns of the liquid crystals.

It is known that a layer of liquid crystals in smectic mesophase can be organized into layers (with calamitic or discotic liquid crystals in particular), in contrast to a conventional nematic mesophase of the prior art. These layers have a thickness of the order of a nanometer.

However, constrained within a volume, these layers may not be flat at every point and consequently may slope strongly and at a very large scale (in comparison with the molecules of liquid crystals). These layers have, for example, a thickness E, of the order of a nanometer.

Among layered structures, textures having focal domains in the smectic phases are known.

By analogy, in the mesophase P, the electroactive layer can be structured, in layers of liquid crystals with a thickness $E_c$ of the order of a nanometer (for example at most 100 nm), and in a hitherto unpublished way it can be a phase which is not smectic.

The domains can be comparable (by type) to focal conic domains (referred to as FCDs) of the smectic (A) phases, especially toric focal conic domains (TFCDs), non-toric (non-TFCD, parabolic, hemicylindrical (in particular oily streaks)) focal conic domains or fan-shaped focal conic domains (fan-shaped FCDs).

For example, without electric field, the domains of TFCD type comprise:

- in a central zone, flat layers which are parallel to one another and to the electrodes, with the liquid crystals oriented to the normal,
- and, in the limiting zones, sloped (retaining the thickness $E_c$).

The defects generate these zones of high curvatures.

Liquid crystals have a tendency, in the scattering OFF state, to be with a normal orientation to the layers (and to the electrodes) in the zones of flat layers and, in the zones of curved layers (without variation in thickness $E_c$), to be tangent to the layers.

The two-dimensional defects are, for example, line defects chosen from a regular or irregular closed contour, such as a regular or irregular circle, a regular or irregular ellipse, a square or rectangle and/or a linear, elliptical, parabolic or hyperbolic geometry and especially the layer comprises a first type of closed defects and a second type of defects.

Mention may be made, as examples of focal conic domains, of those described in the publication entitled "Periodical lattices of frustrated focal conic defect domains in smectic liquid crystal films", B. Zappone et al., Soft Matter, 2012, 8, pp 4318-4326, and also the publications cited in this reference.

Preferably, use is made of anchoring layers which serve for the anchoring of the liquid crystals by surface interactions during manufacture, in the absence of applied field.

At the surface with the anchoring layers, the crystals can remain attached to the surface up to a certain field (voltage) level.

For the formation of the domains comprising defects, the stack of layers can thus additionally comprise:

- in contact with the face A1, a first surface anchoring layer for the liquid crystals, capable of anchoring at least a fraction of the liquid crystals (in the domains) in contact with this first anchoring layer according to a first, preferably planar, orientation in the absence of said applied electric field, first anchoring layer which is preferably transparent (optionally tinted), in particular with an at most micrometric and even submicrometric thickness $E_1$
- in contact with the face A2, a second surface anchoring layer, in particular normal or degenerate planar, capable of orientating a fraction of the liquid crystals in contact with this second anchoring layer according to a second orientation similar to or distinct from the first orientation in the absence of said applied electric field, second anchoring layer which is preferably transparent (optionally tinted), with an at most micrometric and even submicrometric thickness $E_1$.

The anchoring layers, which are in particular antagonistic, serve to generate 2D topological defects which contribute to the abovementioned electro-optical properties. There may even be more than two (three or more) anchoring layers therein; there are then several layers of liquid crystals spaced out by anchoring layers.

There may also be, on one and the same surface, several distinct anchoring zones. These defects are generated by mechanical deformations of the structure of the material and are obtained by the stresses imposed by the two anchoring layers, forcing the liquid crystals into contact with these layers at specific and distinct orientations.

One of the layers can ultimately be an air-filled cavity (normal anchoring function), preferably of unvarying thickness in order to avoid iridescence, between the second electrode and the face A1. The air-filled cavity can be obtained by peripheral spacers and/or spacers emerging from the electroactive layer (transparent, in particular plastic, glass, in particular beads), in particular of height (and even of greater size).

The first anchoring layer can be a planar anchoring and the second anchoring layer is a normal anchoring or the first anchoring layer can be a degenerate planar anchoring and the second anchoring layer is a degenerate planar anchoring.

The planar anchoring can be:

- without favored direction (referred to as degenerate)
- or unidirectional, fixing zenithal and azimuthal orientation of the director n of the liquid crystal, for example by texturing, rubbing of the planar anchoring layer, for example comprising nano- or microgrooves
- or even along several directions which intersect (at 90°, and the like) by texturing, rubbing of the planar anchoring layer.

A velvet cloth can be used for the rubbing.

The first anchoring layer, which is in particular hydrophilic, is, for example:

- dielectric (in particular amorphous, polymeric and/or inorganic, a glass), with a functionalization of the surface Sb, especially a layer based on polyvinyl alcohol (PVA), on polyimide, for example for a planar anchoring
- or semiconducting, such as molybdenum disulfide or molybdenum(IV) sulfide,
- electrically conductive, in particular which is a fraction of thickness of the first electrode.

For a unidirectional planar anchoring, it is possible to use a film of fluoropolymer, such as polytetrafluoroethylene PTFE or Teflon (with the chains of polymers aligned along the direction of movement of the Teflon rod during the deposition).

The second anchoring layer is, for example:

- dielectric (in particular amorphous, polymeric and/or inorganic, a glass) with a functionalization of the surface S'b (silanization for a normal anchoring), in particular a layer of polyvinyl alcohol (PVOH), of polyimide, for a planar anchoring
- or semiconducting
- or electrically conductive, in particular which is a fraction of thickness of the second electrode
- a gas-filled cavity, an air-filled cavity (if a normal anchoring is desired).

One of the anchoring layers can be an amorphous polymer (poly(methyl methacrylate) PMMA, polycarbonate, polystyrene) with an optional texturing or rubbing and the other of the anchoring layers made of crystalline polymer (PET, nylon, poly(butylene terephthalate) PBT, PVA) with an optional texturing or rubbing.

For a normal anchoring, the layers most commonly used are based on octyltrichlorosilane (OTS) and N,N-dimethyl-N-octadecyl-3-aminopropyltrimethoxysilyl chloride (DMOAP).

A layer based on sodium dodecyl sulfate (SDS) or also mixtures of alkanethiols can also generate a normal anchoring.

One or the first and second anchoring layers are, for example, deposited by the liquid route respectively on the first and second electrodes (self-supporting or deposits).

The first anchoring layer can be a film, preferably a thin (flexible, and the like) film, for example of at most 200 µm or 50 µm, which in particular:

- carries the first electrode (itself having a free surface, for example exterior face or in an internal space of a multiple glazing or else in contact with a functional film which is in particular flexible, polymeric (hard coat, with functional coating, for example solar control, low-emissivity or feed for an (opto)electronic device), and the like), or a lamination interlayer, such as EVA or PVB, described in detail later (adhesive contact)

or is bonded to the first electrode by an optical adhesive (itself on a support, such as a functional film which is in particular flexible and/or polymeric (hard coat, with functional coating on the opposite side, for example solar control, low-emissivity or feed for an (opto) electronic device) and the like) and itself optionally bonded (in adhesive contact with) to a lamination interlayer, such as EVA or PVB (described in detail later), and the second anchoring layer can be a film, preferably a thin (flexible, and the like) film, for example of at most 200 μm or 50 μm, which in particular:

carries the second electrode (itself having a free surface, for example exterior face or in an internal space of a multiple glazing or else in contact with a functional film which is in particular flexible and/or polymeric (hard coat, with functional coating, for example solar control, low-emissivity or feed for an (opto)electronic device) and the like) and itself optionally bonded (in adhesive contact with) to a lamination interlayer, such as EVA or PVB (described in detail later), or is bonded to the second electrode by an optical adhesive (itself on a support, such as a functional film which is in particular flexible and/or polymeric (hard coat, with functional coating on the opposite side, for example solar control, low-emissivity or feed for an (opto)electronic device) and the like) and itself optionally bonded (in adhesive contact with) to a lamination interlayer, such as EVA or PVB (described in detail later).

The thermotropic mesophases are classified according to their degree of order and following the morphology and the chemical structure of the mesogens.

In a preferred implementation, the phase P is nematic which is optionally twisted and known as cholesteric and the phase P' is smectic.

Also known as nematic mesophase P is a biaxial nematic phase (with orientational order in two directions), or also a nematic “twist-bend” phase.

Known among the smectic phases are:

smectic A SmA (preferably), smectic B SmB, smectic C SmC, smectic I SmI, and smectic F, twisted or chiral smectic phases which have a center of asymmetry with the notation *like SmC*, and the phases: E, G, H, J, K, which are of smectic type.

The transition between the smectic phase (twisted or non-twisted) and the nematic phase can be direct by gradually increasing the temperature.

Strictly speaking, the phases J, G, E, K and H are of smectic type (“soft” crystals). Mention may be made of the Goodby, Handbook of Visual Display Technology, 2012, as reference manual.

The majority of the smectic phases never directly pass in transit toward the nematic phase. Furthermore, depending on the chemical compound, by gradually increasing the temperature, a smectic C phase can pass in transit toward a smectic A phase and then a nematic phase or directly toward a nematic phase without passing through the smectic A phase.

Between the phase A (smectic) and the nematic phase, there may exist one or more intermediate smectic phases. For example, some compounds can have this sequence: G, J, SmI, SmC, SmA, N.

Discoids can form “discotic nematic” or “discotic cholesteric” phases but they can also be stacked up to form columnar phases of variable geometry: vertical, oblique, and the like (colH, CoIR, ColOBI). The columns are fluid in the sense that the distances between two molecules of one and the same column fluctuate more or less strongly and that there is no long-range order. Moreover, there exists no positional correlation between the molecules belonging to two neighboring columns. The very rich polymorphism of the smectic phases reduces the types of textures possible.

The liquid crystals can be of diverse shapes:

calamitic: cylindrical elongated shape (anisotropic geometry); a length L1 and a width W1 with L1/W1 are defined and/or discotic: disk having aromatic body/bodies (several adjacent aromatic rings) D, columnar stack or layered structure (smectic phase)

curved banana-shaped core, for example with a mesophase B7.

The liquid crystals can be molecules with an anisometric structure comprising alkyl or alkoxy endings. (CH2)x.

Preferably, the liquid crystals have a rigid part, the aromatic core (case of thermotropic liquid crystals), and one or more flexible parts, generally aliphatic chains. The central part is generally rigid for the formation of mesophases. The ends are flexible.

For the lyotropic liquid crystals, the rigid part is substituted by an ion; this is the case, for example, for the phospholipids, to which one or more alkyl chains are grafted. They can be anisotropic micelles, in the form of rugby balls or disks.

To this geometric anisotropy can be added a chemical anisotropy if the rigid and flexible parts are respectively polar and nonpolar; the molecule is then said to be amphiphilic or amphipathic.

The chemical structure can be as follows:

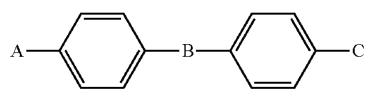

with:

A: orienting group (cyano, nitro, methyl, halogen, and the like)

B: bridging group (often linear) (alkene, ester, and the like)

C: $C_nF_{2n+1}$ perfluorinated or $C_nH_{2n+1}$ polyether alkane (A=C sometimes)

Reference may also be made to the liquid crystals mentioned in the patent GB 0 823 013.

Metallotropic liquid crystals are themselves liquid crystals possessing one or more metal atoms in their molecular structure. The molecule is then called “metallogenic”.

The liquid crystals with smectic A and nematic mesophases are preferred.

Mention may be made, as families of liquid crystals, of:

the cyanobiphenyls, for example 8CB, which is 4-octyl-4'-cyanobiphenyl, alone or as a mixture with 4-cyano-4'-pentylbiphenyl (5CB)

a mesogen containing silicon, a mesogen with siloxane, an organosiloxane
a benzoate.

Use may be made of the liquid crystals mentioned in the patent WO2010/070606.

Use may also made of the LCs (alone or as a mixture with others) mentioned in the publication Goodby et al., Liquid Crystals, June 2015, entitled “What makes a liquid crystal? The effect of free volume on soft matter”:

sexiphenyl (FIG. 1),
quinquephenyl, 2',3''''-dimethylsexiphenyl, undecyloxy and dodecyloxycyanobiphenyl (FIG. 1)
those of Table 3, in particular the first 3
those of Table 5
the TBNs (Twist-bend nematic phases).

It is possible to prepare mixtures of liquid crystals in order to lower the temperature T1 for transition between phases P and P', for example between smectic A and nematic, for example a mixture of 8CB and 5CB which does not have a smectic phase for lowering T1.

The polymers are, for example, obtained from the following polymer precursors:

diacrylates, dimethacrylates
polymerizable dicyclohexylbenzenes, described in the document GB 0 217 907
polymerizable monocyclic compounds, described in the document DE10257711
polymerizable compounds comprising a cinnamic acid group, an acetylene group, described in the document GB 0 308 987
polymerizable tolanes, described in the document GB 0 308 984
polymerizable heterocyclic acetylenes described in the document GB 0 308 990.

It is possible to choose polymers having a temperature stability in order to produce a laminated glazing, for example at least 100° C., 120° C., 140° C.

It is the same for the liquid crystals and for the stack of layers.

Naturally, the liquid crystals can extend substantially over the whole surface of the first electrode (and/or of the substrate) or over (at least) one restricted zone; the liquid crystals can optionally be over several zones.

The electroactive layer can be a full layer (of any shape, in particular geometric) or form an identifying mark (symbol, pictogram, and the like).

The electroactive layer can be surrounded and even be in contact with an adhesive seal for polymeric sealing, for example made of epoxy, made of acrylate, for example made of cyanoacrylate.

Furthermore, spacers which can preferably be made of a transparent plastic material are used. The spacers determine (roughly) the thickness of the electroactive layer. For example, spacers made of polymethyl methacrylate (PMMA) are preferred.

The spacers are preferably made of material with an optical index which is (substantially) equal to the optical index of the layer. The spacers are, for example, in the form of beads.

The dielectric substrate of the first electrode (and/or the support of the second electrode) can be made of flexible or inflexible plastic material, for example with a thickness of at most 300 μm or 150 μm or of at least 1 mm.

The plastic material is in particular based on polyester, especially a polyethylene terephthalate (PET) or polyethylene naphthalate (PEN), on polycarbonate (PC), a polyolefin (polyethylene, polypropylene), on polyurethane (PU), on polymethyl methacrylate (PMMA), on polyamide, on polyimide or a polyvinyl chloride (PVC), indeed even on fluoropolymer, such as ethylene-tetrafluoroethylene (ETFE), polyvinylidene fluoride (PVDF), polychlorotrifluorethylene (PCTFE), ethylene-chlorotrifluoroethylene (ECTFE) and fluorinated ethylene-propylene copolymers (FEPs).

The absorption is preferably of less than 0.5% or even of at most 0.2% and with a haze of less than 1.5% and even of at most 1%.

PET is preferred due to its transparency, its surface quality, its mechanical strength and its availability, at all sizes, or also PC or PMMA. The choice depends in particular on the flexibility desired.

The dielectric substrate of the first electrode (and/or the support of the second electrode) can be greater in size than the electroactive layer.

In particular, said substrate (and/or said support) can be coated with an electrically conductive layer covering all or part of its main face (for example at least 50% or 80%), one region of which forms the first electrode (the second electrode), in particular electrically insulated (by one or more insulating lines, laser etching, and the like) from another region of this layer. This electrically conductive layer can be low-emissivity to serve as solar control layer.

Use may be made, for example, of a clear PET film coated with an electrically conductive layer, for example clear PET film denoted XIR from Eastman, a coextruded film made of PET-PMMA, for example of the SRF 3M® type (SRF for Solar Reflecting Film), but also numerous other films (for example made of PC, PE, PEN, PMMA, PVC), and the like.

One of the free external faces of the stack can comprise a temporary protective plastic film (liner) with a covering adhesive layer (acrylic, and the like)—as full face—or forming a peripheral frame. This adhesive layer can be used to fix the stack to any type of flat or curved support which is transparent, such as a glazing or a plastic film, or opaque (wall), if the device is a switchable mirror (the electrode destined to be on the support side is then reflecting).

For the electrodes, it is possible to use conducting polymers of one at least of the following families:

the family of the polythiophenes, such as PEDOT poly (3,4-ethylenedioxythiophene), PEDOT/PSS, that is to say poly(3,4-ethylenedioxythiophene) mixed with polystyrenesulfonate, and any other derivative as described in the application US2004253439,
or else poly(acetylene)s, poly(pyrrole)s, poly(aniline)s, poly(fluorene)s, poly(3-alkylthiophene)s, polytetrathiafulvalenes, polynaphthalenes, poly(p-phenylene sulfide) and poly(para-phenylene vinylene)s.

For the polythiophenes, it is possible to choose, for example, the product sold by HC Strack under the name Baytron® or else by Agfa under the name Orgacon®, or under the name Orgacon EL-P3040®.

A PSA may be used in order to bond the stack of layers to a sheet.

PSAs are generally based on an elastomer coupled with an appropriate additional adhesive agent or “tackifying” agent (for example an ester resin).

The elastomers can be based:

1/ on acrylates, which may be sufficiently sticky not to require an additional tackifying agent, 2/ on nitriles, 3/ on silicone, requiring special tackifying agents, such as silicate resins of “MQ” type composed of monofunctional trimethylsilane (“M”) which has reacted with quadrifunctional silicon tetrachloride (“Q”). PSAs based on silicone are, for example, polydimethylsiloxane gums and resins dispersed in xylene or a mixture of xylene and toluene, 4/ on block copolymers based on styrene, such as styrene-butadiene-styrene (SBS), styrene-ethylene/butylene-styrene (SEBS), styrene-ethylene/propylene (SEP) or styrene-isoprene-styrene (SIS) block copolymers, 5/ on vinyl ethers.

Advantageously, the pressure-sensitive adhesive is chosen from PSAs based on acrylates and PSAs based on silicone.

These adhesives are sold in the form of double-sided adhesive rolls.

Mention may be made, as PSAs based on silicone, of the Dow Corning® adhesives, such as 2013 Adhesive, 7657 Adhesive, Q2-7735 Adhesive, Q2-7406 Adhesive, Q2-7566 Adhesive, 7355 Adhesive, 7358 Adhesive, 280A Adhesive, 282 Adhesive, 7651 Adhesive, 7652 Adhesive or 7356 Adhesive.

In preferred implementations, the stack can comprise the following (strict or nonstrict) sequence (the elements in brackets being optional):

- stack No. 1: (hard coat or liner)/PET substrate/first electrode (such as ITO, and the like)/(first anchoring layer)/electroactive layer/(second anchoring layer)/second electrode (such as ITO, and the like)/PET support/(hard coat)
- stack No. 2: glass (tinted and/or bent, for example)/first lamination interlayer sheet (PVB or EVA) or optical adhesive/PET substrate/first electrode (such as ITO, and the like)/(first anchoring layer)/electroactive layer/(second anchoring layer)/second electrode (such as ITO, and the like)/PET support/(hard coat)/second lamination interlayer sheet (PVB or EVA, like the first) or optical adhesive/glass (tinted and/or bent, for example).

Each film is preferably flexible, flat or curved, and capable of adjusting to the curvature or curvatures of a glazing or other support, for example. Each substrate, support can be flexible, flat or curved, and capable of adjusting to the curvature or curvatures of an additional glazing or other support, for example.

The main faces of each layer (and/or of each substrate) can be rectangular, square or even of any other shape (round, oval, polygonal and the like). Each barrier layer and/or substrate can be large in size, for example with a surface area of greater than 0.02 $m^2$, indeed even 0.5 $m^2$ or 1 $m^2$.

The or each layer—deposit or film—(and/or each substrate) can be transparent and preferably exhibit a light transmission $T_L$ of greater than or equal to 70%, preferably of greater than or equal to 80%, indeed even of greater than or equal to 90%.

The or each layer—deposit or film—can be tinted, for example in blue, green, gray or bronze. The light transmission $T_L$ can then be at most 55%, in particular from 20% to 50%.

The or each substrate, in particular made of glass, can, however, be tinted, for example in blue, green, gray or bronze.

The first and/or the second electrode can be full layers rather than patterned layers (with holes and/or lines of discontinuities).

With regard to the dielectric substrate (or support), the first electrode (the second electrode), which is preferably transparent, can be inorganic; in particular, the inorganic electrically conductive layer is based on one or more transparent conducting oxides or a metal layer of at most 20 nm, preferably within a stack of thin layers of metal or silicon oxides and/or nitrides.

The first electrode and/or the second electrode can be a transparent conductive oxide layer, known as TCO layer.

The TCO layer preferably has a thickness suitable for having an ("intrinsic") sheet resistance of less than or equal to 150Ω/□, preferably of less than or equal to 120Ω/□.

The TCO layer is, for example, supplied electrically via current supply means which are preferably metallic (based on silver, on copper, and the like), preferably in the form of a (metal) strip/along an edge.

The barrier film or the substrate (support) carrying the TCO layer can protrude beyond the electroactive layer in order to promote the electrical connection, for example made as in the application WO2011/161391 (FIG. 1 or other figures) or EP 1 653 275.

The layer of a transparent electrically conductive oxide is preferably a layer of indium tin oxide (ITO). Other layers are possible, including thin layers:

- based on indium zinc oxide (called "IZO"), on indium gallium zinc oxide (IGZO),
- based on doped zinc oxide, preferably doped with gallium or with aluminum (AZO, GZO), based on niobium-doped titanium oxide, based on cadmium stannate or zinc stannate,
- based on fluorine-doped tin oxide ($SnO_2$:F), based on antimony-doped tin oxide.

In the case of aluminum-doped zinc oxide, the doping level (that is to say, the weight of aluminum oxide with respect to the total weight) is preferably less than 3%. In the case of gallium, the doping level can be higher, typically within a range extending from 5 to 6%.

In the case of ITO, the atomic percentage of Sn is preferably within a range extending from 5 to 70% and in particular from 10 to 60%.

For layers based on fluorine-doped tin oxide, the atomic percentage of fluorine is preferably at most 5% and generally from 1 to 2%.

ITO is particularly preferred or even IZO, AZO, GZO or IGZO. Easily deposited by a cathode sputtering process, in particular a magnetron cathode sputtering process, these layers are characterized by a lower roughness than by CVD.

The electrodes commonly used are made of mixed indium tin oxide (ITO). In order to protect from short circuits generated by conducting impurities having a size greater than or equal to the distance between the electrodes, each of the ITO layers can be coated with one or more dielectric layers of oxides or nitrides, such as $Si_3N_4$ or $SiO_2$, as mentioned in the document WO2014/072596, with a cumulative thickness of 50 to 150 nm.

One of the advantages of fluorine-doped tin oxide is, on the other hand, its ease of deposition by chemical vapor deposition (CVD), and can be implemented on the float flat glass production line. In one embodiment, the layers of the stack are obtained by chemical vapor deposition directly on the line for production of the glass sheet by the float glass method. The deposition is carried out by spraying precursors through nozzles, over the ribbon of hot glass. The deposition of the different layers can be carried out at different points of the line: in the float chamber, between the float chamber and the lehr, or in the lehr. The precursors are generally organometallic molecules or molecules of the halides type.

Mention may be made, by way of examples, for fluorine-doped tin oxide, of tin tetrachloride, monobutyltin trichloride (MBTC), trifluoroacetic acid or hydrofluoric acid. Silicon oxide can be obtained using silane, tetraethoxysilane (TEOS) or else hexamethyldisiloxane (HDMSO), optionally using an accelerator, such as triethyl phosphate.

It is also possible to position, between the substrate and the TCO layer, a stack of neutralization layers. Such layers (at least two layers) make it possible to influence the appearance in reflection of the glazing, in particular its color in reflection. Once the electrically conductive support is coated with the layer of liquid crystals (and even once another identical electrically conductive support has been added), colors are obtained which are preferably neutral, slightly bluish or green, characterized by colorimetric coordinates a*, b* close to 0, a*, b* negative or a* negative and b* slightly positive, are preferred to purple, pink, red colors (a* more positive).

In a preferred embodiment, the stack comprises, in this order, on the main face, under the TCO layer:

a first underlayer based on silicon nitride ($SiN_x$, preferably $Si_3N_4$) which is optionally doped, preferably aluminum, with a thickness $t_y$ of 5 to 50 nm, or better still of 10 nm to 35 nm, preferably (directly) in contact with the main face and preferably essentially composed of a silicon nitride which is optionally doped, preferably aluminum;

a second underlayer based on silicon oxide ($SiO_x$, preferably $SiO_2$), with a thickness $t_z$ of 10 to 50 nm, or better still of 20 nm to 50 nm, preferably essentially composed of silicon oxide, underlayer undoped or optionally doped, preferably aluminum, preferably in contact with the TCO layer.

More broadly, the underlayer (single in particular) can be a layer based on silicon oxynitride (SiON).

A few examples of stacks of thin layers forming the first electrode are given below:

$SiN_x$/$SiO_x$/TCO (preferably ITO)/$SiN_x$/(SnZnO)/$SiO_x$ $SiN_x$/$SiO_x$/TCO (preferably ITO)/$SiN_x$/SnZnO/$SiO_x$ $SiN_x$/(SnZnO)/$SiO_x$/TCO (preferably ITO)/$SiN_x$/(SnZnO)/$SiO_x$ $SiO_xN_y$/TCO (preferably ITO)/$SiO_xN_y$/(SnZnO)/$SiO_x$.

The different layers can be deposited on the substrate by any type of process for the deposition of thin layers. It may, for example, concern processes, (liquid or solid) pyrolysis, chemical vapor deposition (CVD), in particular plasma-enhanced chemical vapor deposition (PECVD), optionally under atmospheric pressure (APPECVD), evaporation, indeed even of sol-gel type.

The device according to the invention can comprise a laminated glazing comprising:

a first additional glass sheet, in particular with a thickness of 0.7 mm to 4 mm, a thermoplastic lamination interlayer, a second additional glass sheet, in particular with a thickness of 0.7 mm to 4 mm or even of less than 0.7 mm, or else a sheet of plastic, such as a polycarbonate or a PMMA (in particular with a lamination interlayer made of PU), the main internal faces, referred to as F2 and F3, of the first and second additional glass sheets facing one another, the stack being between the faces F2 and F3 and preferably in the lamination interlayer.

Preferably, the thermoplastic lamination interlayer surrounds the edge of the stack.

The edge face of the stack can be set back with respect to the outermost edge face of the lamination interlayer (or of the first sheet).

Preferably, the optional first and/or second substrates preferably have a thickness of at most 0.7 mm and even of at most 0.3 or 0.2 mm. It is possible to choose, for the glass substrate or substrates, thin (less than 1 mm) glass and even ultrathin glass (UTG).

One of the additional glass sheets can be tinted and the other clear or extra-clear. The thermoplastic lamination interlayer can be clear, extra-clear or tinted.

The device according to the invention can comprise a glazing, in particular a laminated and/or bent glazing, and the stack forms a strip, in particular a peripheral strip, over a portion of a main face of the glazing.

The device having scattering which can be varied by liquid crystals as defined above can be used in a vehicle or building.

It can be used in particular as:

internal partition (between two rooms or in a space) in a building, in a ground, rail, nautical or aerial vehicle (between two compartments, in a taxi, bus, train, and the like), in particular as glazed wall of shower or bath, glazed door (front or rear), window (single, double, triple glazing), ceiling, tiling (floor, ceiling), toilet door, a glazed portion of street or household furniture, glazing of an automobile vehicle (car, truck, bus, and the like), thus a ground, rail or nautical vehicle (boat): windshield, side window, roof, and the like, projection or back projection screen, shop window or display case, in particular of a counter.

Naturally, it can form all or part of a glazing (a partition and window of transom type and the like).

The device according to the invention can comprise a laminated and in particular bent glazing, and the stack of layers is between the first and second glazings, respectively "exterior" and "interior" glazings, and forms a peripheral strip over an upper portion of the glazing, the "external" edge face of the stack being masked from the outside by a first opaque peripheral layer, in particular an enamel, on the exterior glazing (preferably on face F2), and/or the "internal" edge face of the stack being masked from the inside by a second opaque peripheral layer, in particular an enamel, on the interior glazing (on face F4, for example, indeed even face F3).

For its incorporation in a laminated glazing, it is possible to use:

three sheets (monolayer or multilayer PVB, EVA, PU, and the like), in particular two full sheets, with each in contact with one of the two glazings, and a central sheet with a store for housing the stack, two sheets (monolayer or multilayer PVB, EVA, PU, and the like), especially if the stack is fairly thin, in order for the two sheets to join by flow on either side of the stack.

It is possible, for the substrate and/or the support or else or for an additional glass sheet or a glazing of a laminated and/or multiple glazing, to choose a clear or extra-clear glass. A clear glass typically contains a content by weight of iron oxide of the order of 0.05 to 0.2%, whereas an extra-clear glass generally contains approximately 0.005 to 0.03% of iron oxide.

The additional glass sheet or a glazing of a laminated and/or multiple glazing can, however, be tinted, for example in blue, green, gray or bronze.

A tinted additional glass sheet or a tinted glazing of a laminated and/or multiple glazing can preferably exhibit a light transmission $T_L$ of greater than or equal to 10%—for example in a context where the environment on the side of the exterior face of the substrate (opposite the face with the electrode) is highly illuminated —, and preferably is greater than or equal to 40%.

The glass is preferably of soda-lime-silica type but it can also be a glass of borosilicate or alumino-borosilicate type. The thickness of the glass is generally within a range extending from 0.5 to 19 mm, preferably from 0.7 to 9 mm, in particular from 2 to 8 mm, indeed even from 4 to 6 mm.

The glass is preferably of the float glass type, that is to say capable of having been obtained by a process which consists in pouring the molten glass onto a bath of molten tin ("float" bath). In this case, the stack can be deposited both on the "tin" face and on the "atmosphere" face of the substrate. The terms "atmosphere" and "tin" faces are understood to mean the faces of the substrate which have respectively been in contact with the atmosphere prevailing in the float bath and in contact with the molten tin. The tin face contains a small superficial amount of tin which has diffused into the structure of the glass.

The thermoplastic lamination interlayer provides a bond with a rigid or flexible element. This polymer lamination interlayer can in particular be a layer based on polyvinyl butyral (PVB), on ethylene-vinyl acetate (EVA), on polyethylene (PE), on polyvinyl chloride (PVC), on thermoplastic urethane, on polyurethane PU, on ionomer, on adhesive based on polyolefin, on thermoplastic silicone or made of multi- or one-component resin which can be crosslinked thermally (epoxy, PU) or with ultraviolet radiation (epoxy, acrylic resin).

The PVB interlayer can be wedge-shaped, thus with a cross section which decreases in wedge shape from the top toward the bottom of the laminated glazing in order to avoid a double image in the case of a head-up display (HUD), very particularly for a windshield.

The PVB interlayer is optionally acoustic and/or tinted.

The acoustic PVB interlayer can comprise at least one "central" layer made of viscoelastic plastic with vibro-acoustic damping properties, in particular based on polyvinyl butyral (PVB) and plasticizer, and furthermore comprising two external layers made of standard PVB, the central layer being between the two external layers.

Optionally, one or both external layers has a cross section which decreases in wedge shape from the top toward the bottom of the laminated glazing, the layer made of viscoelastic plastic with vibro-acoustic damping properties having an unvarying cross section from the top toward the bottom of the laminated glazing. Mention may be made, as example of acoustic sheet, of the patent EP 0 844 075.

The first and/or second glazing of the laminated glazing can (depending on the esthetic result or the optical effect desired) be a clear glass (with a light transmission $T_L$ greater than or equal to 90% for a thickness of 4 mm), for example a glass of standard soda-lime composition, Planilux® from Saint-Gobain Glass, or an extra-clear glass ($T_L$ greater than or equal to 91.5% for a thickness of 4 mm), for example a soda-lime-silica glass with less than 0.05% of Fe(III) or $Fe_2O_3$, the Diamant® glass from Saint-Gobain Glass or the Optiwhite® glass from Pilkington or the B270® glass from Schott, or a glass of another composition described in the document WO04/025334. It is also possible to choose the Planiclear® glass from Saint-Gobain Glass.

The glass of the first and/or second glazing can be neutral (without coloration) or (slightly) tinted, in particular gray or green, such as the TSA glass from Saint-Gobain Glass. The glass of the first and/or second glazing may have undergone a chemical or heat treatment of the hardening or annealing type or a tempering (in particular in order to obtain a better mechanical strength) or be semitempered.

The light transmission $T_L$ can be measured according to the standard ISO 9050:2003 using illuminant D65 and is the total transmission (in particular integrated over the visible region and weighted by the curve of sensitivity of the human eye), taking into account both direct transmission and possible diffuse transmission, the measurement being carried out, for example, using a spectrophotometer equipped with an integrating sphere, the measurement at a given thickness subsequently being converted, if appropriate, to the reference thickness of 4 mm according to the standard ISO 9050:2003.

The bent laminated glazing according to the invention, in particular windshield or side window, can have a $T_L$—in the clear glass area—which is preferably at least 70% and even at least 75% or even at least 80%.

The bent laminated glazing according to the invention, in particular sunroof, can have a light transmission $T_L$ of at most 10% and even of 1 to 6%.

For an automobile roof, one at least or all of the following criteria are preferred:

- an energy transmission $T_E$ of at most 10% and even of 4 to 6%,
- an energy reflection $R_E$ (preferably face F1 side) of at most 10%, better still of 4 to 5%,
- and a total transmission of the solar energy TST <30% and even <26%, even from 20 to 23%.

A table A below gives examples of glass sold by the applicant company. The SGS Thermocontrol® Absorbing/Venus glass improves the thermal comfort by absorbing the energy load in the body of the glass. These glasses are divided into two categories: "Vision" (light transmission >70%) and "Privacy" (light transmission <70%).

TABLE A

| Type of glass | $T_L$ (%) | $T_E$ (%) | $R_E$ (%) |
|---|---|---|---|
| SGS Thermocontrol ® Venus Green 55 | 49 | 27 | 7 |
| Green-tinted high-performance//Clear glass | 28 | 16 | 3 |
| SGS Thermocontrol ® Venus Green 35 | 35 | 22 | 5 |
| SGS Thermocontrol ® Venus Grey 10 | 10 | 8 | 1 |
| SGS Thermocontrol ® Absorbing TSA3+ | 71 | 44 | 18 |
| Standard green glass | 78 | 53 | 25 |

The "Vision" glass is suitable for all types of glazing in the vehicle: green/blue/gray, and provides a reduced energy transmission ($T_E$). The most popular color for this purpose is green. It has been chosen due to its neutral appearance, which does not affect the harmony of the colors of a vehicle.

The "Privacy" glass is a glazing which is bulk-tinted for thermal comfort and privacy. It is a glazing which is supertinted dark green or dark gray. In order to ensure privacy, this glazing exhibits light transmission values which are below 70%, generally around 55% or less. Due to its dark tint, this type of glass also provides a low UV transmission (UV rays can cause skin irritation).

In most countries, Venus/Privacy glass is suitable for the rear side windows (after the B-pillar), rear window and roof.

SGS Thermocontrol® Venus consists of supertinted glazing dark gray or dark green in color. They have all the thermal advantages of the glass of "Vision" type (SGS Thermocontrol® Type) with improved solar protection:

- lower energy transmission values (with respect to all the other glass solutions),
- its dark color also blocks UV radiation, which is responsible for skin irritation and discoloration of the passenger compartment,
- offers greater privacy for the vehicle's passengers (it is difficult to see through the glass from the outside).

Preferably, the bent laminated glazing forms a windshield of a road vehicle, such as an automobile or a truck.

The bending of the first and second glazings (in particular windshield) can be in one or more directions, for example described in the document WO2010136702.

The area of the main face F1 (windshield or roof, in particular) can be greater than 1.5 $m^2$ and be, for example, less than 3 $m^2$.

In order to limit heating in the passenger compartment or to limit the use of air conditioning, one of the glazings at least (preferably the exterior glass) is tinted, and the laminated glazing can also comprise a layer which reflects or absorbs solar radiation, preferably on face F4 or on face F2 or F3, in particular a transparent electrically conductive oxide layer, a "TCO layer", (on face F4) or even a stack of thin layers comprising at least one TCO layer, or stacks of thin layers comprising at least one silver layer (on F2 or F3), the or each silver layer being positioned between dielectric layers.

It is possible to simultaneously have a (silver-containing) layer on face F2 and/or F3 and a TCO layer on face F4.

A TCO layer (a layer of a transparent electrically conductive oxide) can be used for the first or second electrode or on face F4 as described. It is preferably a layer of mixed indium tin oxide (ITO) or a layer of fluorine-doped tin oxide ($SnO_2$:F). Other layers are possible, among which thin layers based on mixed indium zinc oxides (referred to as "IZOs"), based on gallium-doped or aluminum-doped zinc oxide, based on niobium-doped titanium oxide, based on cadmium stannate or zinc stannate, or based on antimony-doped tin oxide. In the case of aluminum-doped zinc oxide, the doping level (that is to say, the weight of aluminum oxide with respect to the total weight) is preferably less than 3%. In the case of gallium, the doping level can be higher, typically within a range extending from 5 to 6%.

In the case of ITO, the atomic percentage of Sn is preferably within a range extending from 5 to 70% and in particular from 10 to 60%. For layers based on fluorine-doped tin oxide, the atomic percentage of fluorine is preferably at most 5%, generally from 1 to 2%. For layers made of ITO, the thickness will generally be at least 40 nm, indeed even at least 50 nm and even at least 70 nm, and often at most 150 nm or at most 200 nm. For layers made of fluorine-doped tin oxide, the thickness will generally be at least 120 nm, indeed even at least 200 nm, and often at most 500 nm.

For example, the low-emissivity layer comprises the following sequence: high-index underlayer/low-index underlayer/a TCO layer/optional dielectric overlayer.

It is possible to choose, a preferred example of low-emissivity layer (protected during a tempering), high-index underlayer (<40 nm)/low-index underlayer (<30 nm)/an ITO layer/high-index overlayer (5-15 nm)/low-index barrier overlayer (<90 nm)/final layer (<10 nm).

Mention may be made, as low-emissivity layer, of those described in the patent US2015/0146286, on the face F4, in particular in examples 1 to 3.

In particular, the face F4 of the laminated glazing is coated with a transparent functional layer, in particular a low-emissivity layer, preferably comprising a TCO layer, including a zone (supplied with electricity and thus an electrode) forming a touch button (for managing the first luminous surface).

It is possible to provide electrical connections with the electrodes. For example, it is possible to use a first peripheral electrically conductive (metal, and the like) strip along the first electrode and a second peripheral electrically conductive strip along the second electrode. For example, the first electrically conductive strip is along the first lateral or longitudinal edge and the second electrically conductive strip is along the second opposite (lateral or longitudinal) and/or adjacent edge.

Conductive bands, in particular metallic conductive bands, for example made of copper, and for example with at most widths of 2 cm, are, for example, fixed at the periphery to the electrodes (one band per electrode, the bands preferably being on opposite edges) for the supplying of electricity.

It is possible to fix (weld, adhesive) electric cables to these electrically conductive strips.

The device according to the invention can be used in combination with other electrically controllable devices, such as those with electroluminescent systems (assembly of specific inorganic LED diodes, organic diodes or OLEDs, TFELs (having thin layers)).

The two can be facing or adjacent within a laminated glazing (the lamination interlayer).

The device according to the invention can be used in particular in a laminated glazing, in combination with another electrically controllable device, such as an electrically controllable electroluminescent device, in particular LED, OLED, TFEL.

In a manufacturing example, the liquid crystals are mixed with a monomer and a small amount of photoinitiator (the liquid crystals acting as solvent) and the polymerization is carried out thermally or photochemically (more rapid, favors a polymeric network at the molecular scale).

The invention is thus targeted at a process for the manufacture of the electrically controllable device having scattering by liquid crystals, in particular as described above, comprising the following stages:

- provision of a first electrode, in particular on a dielectric substrate
- provision of a second electrode, in particular on a dielectric support
- the provision of a mixture comprising:
  - at least one polymer precursor
  - liquid crystals including at least first liquid crystals exhibiting a mesophase P and optionally at least second liquid crystals the mixture exhibiting the mesophase P and a mesophase P', TA being the temperature for transition between the mesophase P and the mesophase P' of the mixture

- if necessary, a polymerization initiator, preferably a photoinitiator
- the formation of a stack of layers comprising, between the first and second electrodes, the formation, starting from said mixture, of an electroactive layer made of a material comprising said liquid crystals which are stabilized by a polymeric network, said formation comprising:
  - at the temperature Ti which is less than TA, thus in mesophase P', the polymerization, preferably by photopolymerization, preferably under ultraviolet or UV radiation, of said precursor or precursors, resulting in said polymeric network.

When the first liquid crystals exhibit the mesophase P and the mesophase P', the first liquid crystals have a temperature Tp for transition between the mesophase P and the mesophase P', TA being preferably less than or equal to Tp, the polymerization is at the temperature Ti which is less than Tp or TA.

The mesophase P can be a nematic mesophase twisted by the addition of a chiral agent to the mixture (in phase P' preferably or in phase P). Thus, without chiral agent, the mesophase P of the first liquid crystals can be non-twisted nematic.

The invention is in particular targeted at a process for the manufacture of the electrically controllable device having scattering by liquid crystals, in particular as described above, comprising the following stages:

- provision of a first electrode, in particular including or coated with a first surface anchoring layer for liquid crystals according to a first optionally degenerate planar orientation, first electrode in particular on a dielectric substrate
- provision of a second electrode, in particular including or coated with a surface anchoring layer for liquid crystals according to a second orientation, in particular a degenerate or normal planar orientation, second electrode in particular on a dielectric support
- the provision of a mixture comprising:
  - at least one polymer precursor (such as a monomer)
  - liquid crystals including at least first liquid crystals exhibiting a mesophase P and a mesophase P' and optionally at least second liquid crystals, the first liquid crystals having a temperature Tp for transition between the mesophase P and the mesophase P', TA being the temperature for transition between the mesophase P and the mesophase P' of the mixture which is in particular less than or equal to Tp
  - if necessary, a polymerization initiator, preferably a photoinitiator
- the formation of a stack of layers comprising, between the first and second electrodes, in particular the first and second anchoring layers, the formation, starting from said mixture, of an electroactive layer made of a material comprising said liquid crystals which are stabilized by a polymeric network with a temperature T1 (in particular less than, indeed even equal to, Tp) from the mesophase P to the mesophase P', said formation comprising:
  - at the temperature Ti which is less than Tp or than TA (thus in mesophase P'), the polymerization, preferably by photopolymerization, under UV radiation, of said precursors, resulting in said polymeric network.

Preferably, the process can comprise, in mesophase P', which is preferably not nematic and even smectic, the formation of domains, in particular subcentimetric domains, with two-dimensional topological defects remaining (substantially) in mesophase P.

The formation of the defects is in particular carried out by one (at least or according to choice) of the following stages:

- by bringing said mixture into contact with first and second layers for anchoring the liquid crystals at the surface
- by application of stresses (between the substrate and the support)
- by application of an electric field, especially a low-frequency alternating electric field, of at most 100 Hz, better still 10 Hz, the mixture comprising charged particles (molecules, and the like).

In particular, said formation of the electroactive layer preferably comprises bringing said mixture into contact with first and second layers for anchoring the liquid crystals at the surface, in particular:

- deposition by the liquid route of a (dielectric or semiconducting) layer, or provision of a (dielectric or semiconducting) element, such as a submillimetric film bonded (adhesively bonded) to the first electrode (or creation of a gas-filled cavity, such as an air-filled cavity (for normal anchoring))
- deposition by the liquid route of a (dielectric or semiconducting) layer, or provision of a (dielectric or semiconducting) element, such as a submillimetric film bonded (adhesively bonded) to the second electrode or creation of a gas-filled cavity, such as an air-filled cavity (for normal anchoring), between the second electrode and the mixture.

It is possible to provide (beforehand) a surface rubbing of the first and/or of the second anchoring layer (in order to form a planar and unidirectional anchoring).

At the temperature T'>T in phase P, the electroactive layer then exhibits domains with two-dimensional topological defects (and exhibits with multistates of variable scatterings).

The mixing can in particular be carried out with stirring starting from powdered precursors (monomers) with thermotropic liquid crystals.

The electroactive layer can be produced using a "dropwise filling" operation or by capillarity of said mixture.

Preferably, the intensity of the UV lamp is controlled in order to control as far as possible the power received on the exposed surface and thus the degree of crosslinking, the degree of polymerization.

In addition, it is possible to provide for the first liquid crystals to have a mesophase P' which is smectic and a nematic mesophase P and for the second liquid crystals to have a mesophase, in particular nematic mesophase, and to be devoid of smectic mesophase.

The polymer precursor, such as a monomer, is preferably miscible with the liquid crystal material (not necessarily in all proportions).

The upper limit will depend on the liquid crystal+monomer mixture (solubility limit which will be dependent, furthermore, for a given mixture, on the temperature and on the nature of the liquid crystal phase of this mixture).

The process can comprise a stage of lamination of said stack which is in particular:

- substrate (flexible, polymeric, PET, UTG, and the like)/first electrode/(first anchoring layer)/electroactive layer/(second anchoring layer)/second electrode/support (flexible, polymeric, PET, UTG, and the like)
- or even first electrode/first substrate-forming anchoring layer/electroactive layer/second support-forming anchoring layer/second electrode this between two glass sheets, in particular bent glass sheets, by means of a polymeric lamination interlayer, in particular thermoplastic interlayer, for example PVB or EVA, lamination interlayer comprising one or more sheets, in particular lamination at a temperature of at most 140° C. and even 120° C., 110° C.

It is thus possible to provide a lamination. In order to form a laminated glazing with said stack (plastic or glass, for example flexible, support and substrate) between two glass sheets (for example with a thickness of 0.7 mm to 5 mm), it is possible to use:

- three sheets (monolayer or multilayer PVB, EVA, PU, and the like), in particular two full sheets, with each in contact with one of the two glazings, and a central sheet with a store for housing the stack,
- two sheets (monolayer or multilayer PVB, EVA, PU, and the like), especially if the stack is fairly thin, in order for the two sheets to join by flow on either side of the stack.

PVB is preferred in the world of vehicles.

One of the glass sheets can be tinted.

Conventionally, the lamination comprises placing under vacuum—by any suction means—, heating and optional pressurizing. A stove or autoclave is used. Thus, the lamination can comprise degassing, sealing of the edge, and involves the employment of appropriate temperatures and pressures; usually, during the autoclaving, the sheet, such as PVB, is brought to a relatively high temperature (greater than 100° C. for PVB, often between 90° C. and 140° C.), which will soften it and allow it to flow. In the case of the use of several sheets, in particular PVB sheets, a noteworthy effect then occurs; the interfaces of the various PVB sheets will disappear; the PVB will, in a way, heal to form, at the end of the autoclaving, a single homogeneous and continuous film.

Under the usual conditions for assembling a laminated glazing, combining heating, placing the interior of the laminated structure under negative pressure (vacuum) aims to discharge the air present between the different constituents (surface of the lamination interlayer rough and irregular before heating), and optionally the application of a pressure on the outside of the laminated structure is carried out in order to promote the adhesive bonding and the lasting cohesion of the assembly.

Figure 2A:
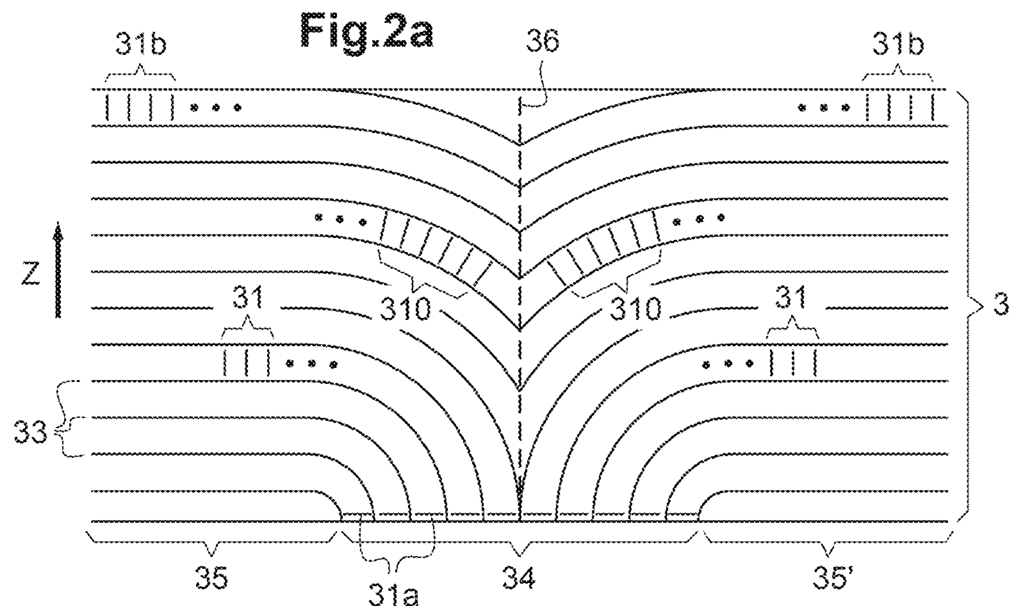
Figure 2B:
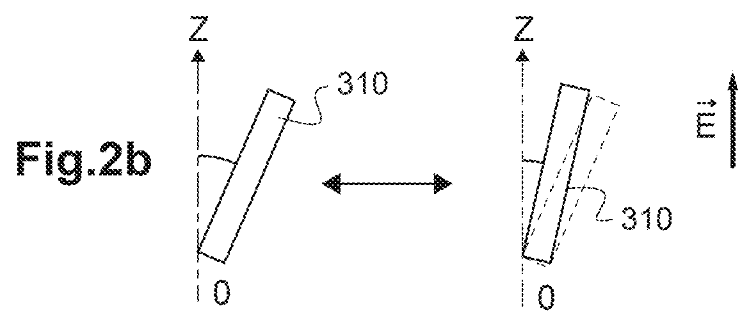
Figure 2C:
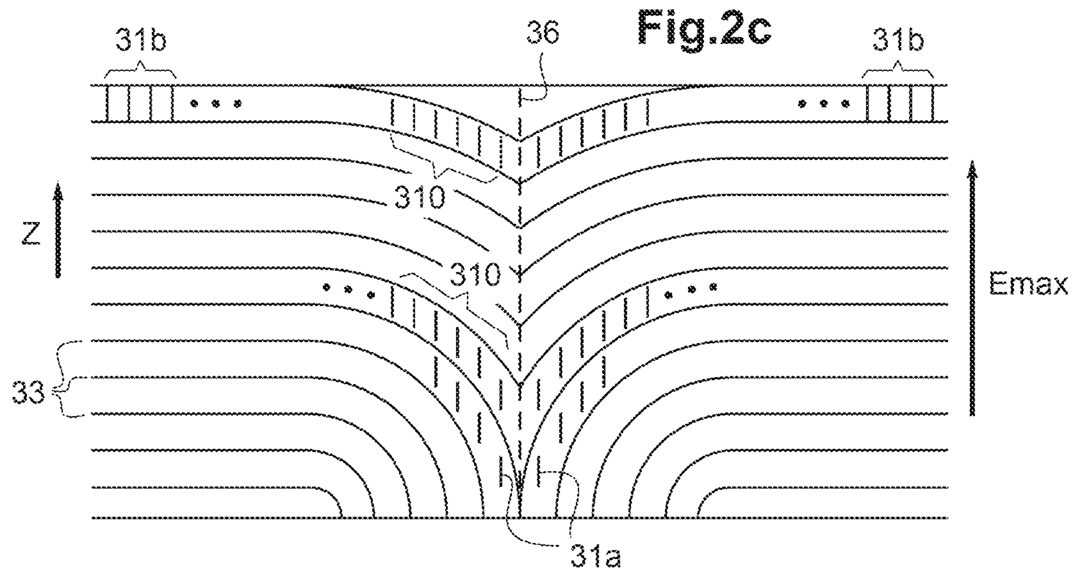
Figure 3A:
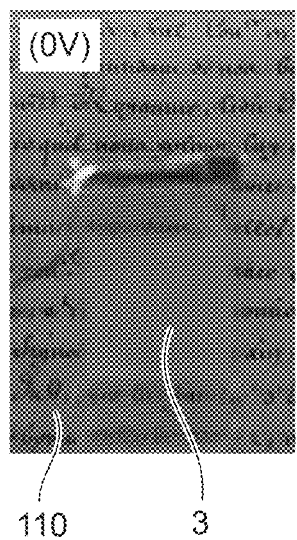
Figure 3B:
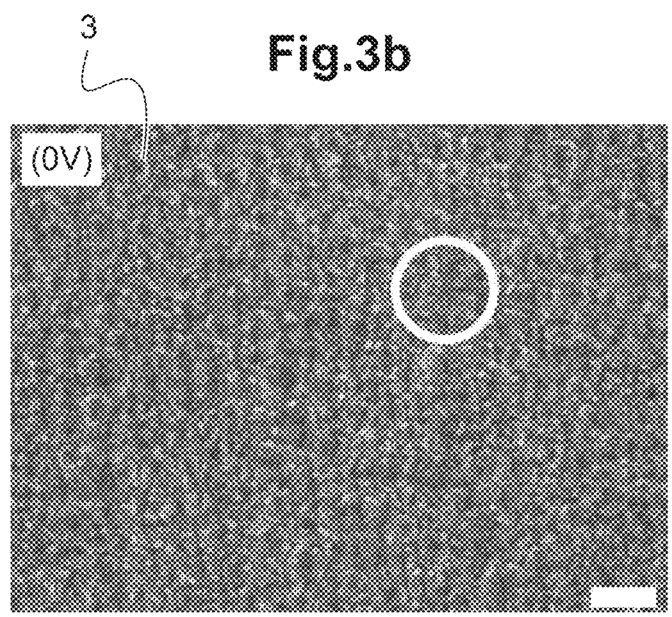
Figure 4A:
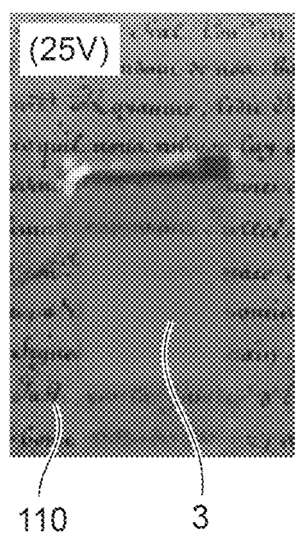
Figure 4B:
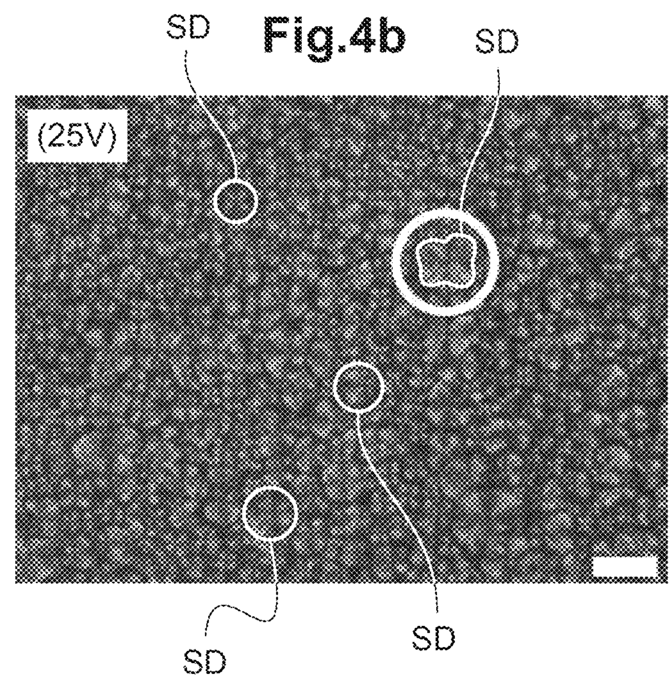
Figure 5A:
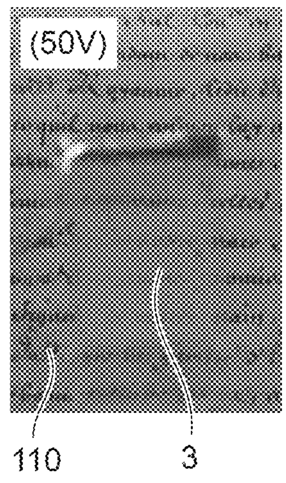
Figure 5B:
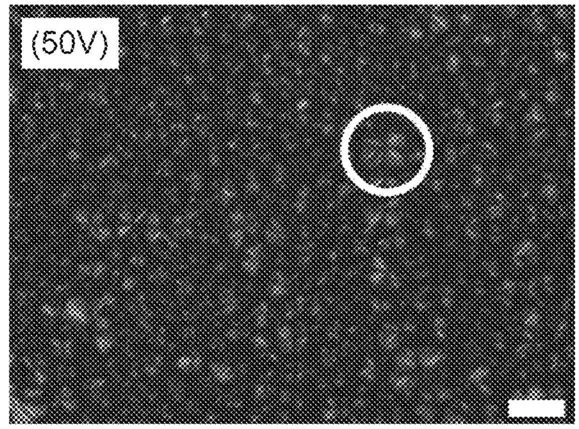
Figure 6A:
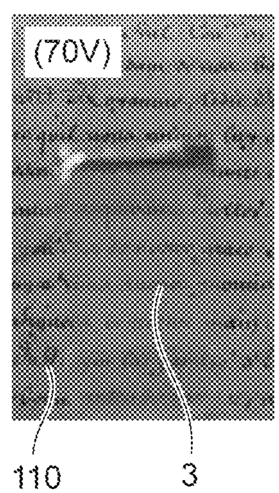
Figure 6B:
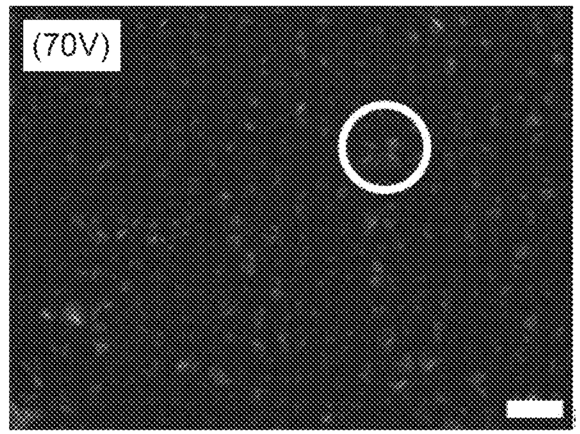

Other details and characteristics of the invention will become apparent from the detailed description which will follow, given with regard to the following appended drawings and in which:

FIG. 1 represents a diagrammatic sectional view of a device having scattering which can be varied by liquid crystals 100 in a first embodiment of the invention FIGS. 2*a* and 2*c* represent a diagrammatic and detailed sectional view of an electroactive layer of the device having scattering which can be varied by liquid crystals of the type of FIG. 1, without electric field or under electric field, FIG. 2*b* illustrating the orientation of some liquid crystals under electric field FIGS. 3*a* to 7*a* show images (in black and white) of the electrically controllable device of FIG. 1 in a light booth with a backdrop 110 (paper with lines of writing) at 20 cm and under illuminant D65 in the absence of electric field (3*a*), for an electric field normal to the electroactive layer with a voltage of 25V (4*a*), of 50V (5*a*), of 70V (6*a*), and back to 0V (7*a*)

FIGS. 3*b* to 7*b* show images (in black and white) obtained by polarized light optical microscopy (PLM) under a magnification of 20 (with a scale in white line of 50 μm), images showing the domains having line defects of the electroactive layer of the electrically controllable device of FIG. 1 in the absence of electric field (3*b*), for an electric field normal to the electroactive layer with a voltage of 25V (4*b*), of 50V (5*b*), of 70V (6*b*), and back to 0V (7*b*)

Figure 8:
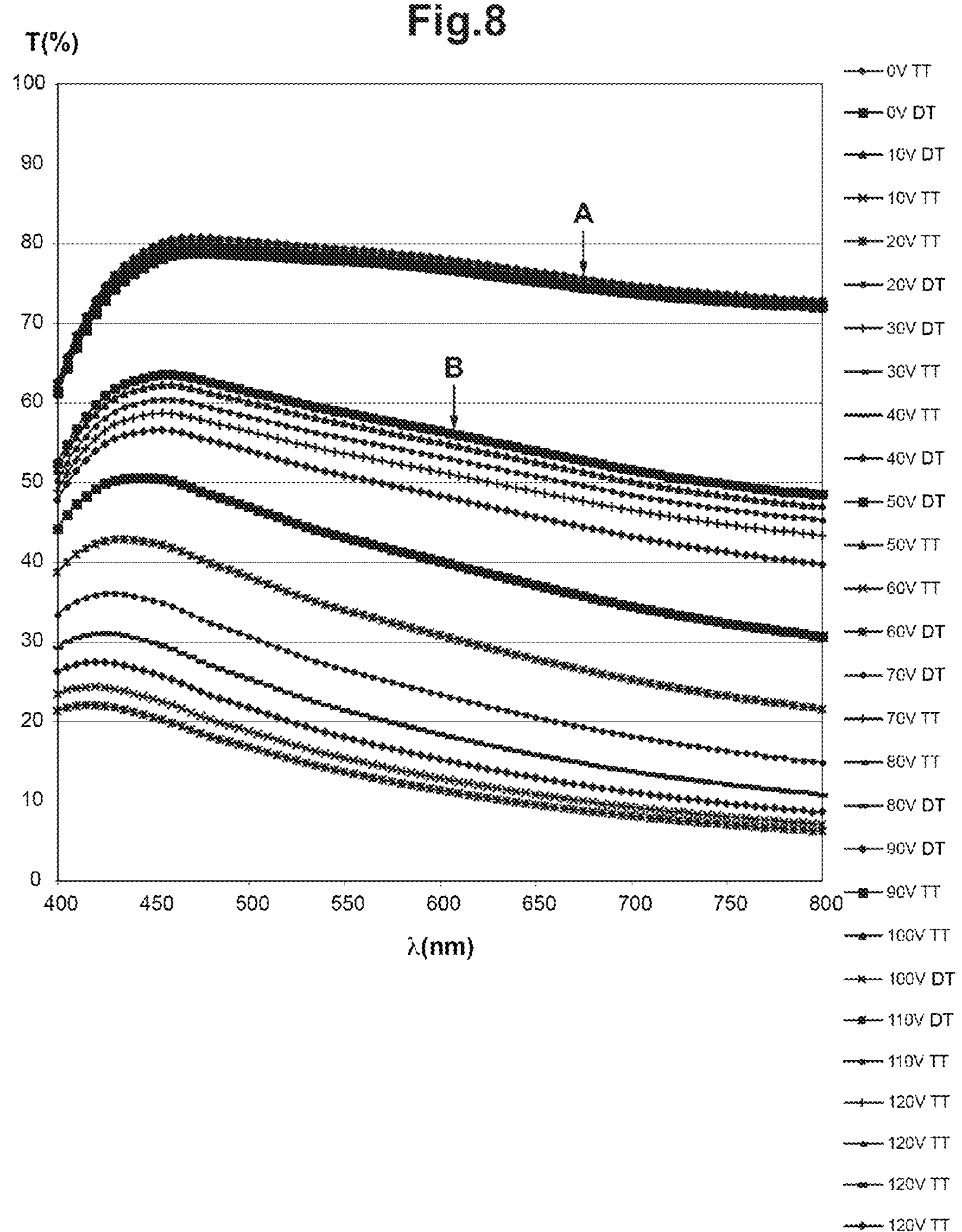

FIG. 8 shows an assembly A of curves corresponding to the total transmission TT as a function of the wavelength between 400 and 800 nm without electric field or under electric field normal to the electroactive layer with a voltage of 10V to 110V per step of 10V and an assembly of curves B corresponding to the diffuse transmission DT as a function of the wavelength between 400 and 800 nm without electric field or under electric field normal to the electroactive layer with a voltage of 10V to 110V per step of 10V for the device of FIG. 1

Figure 9:
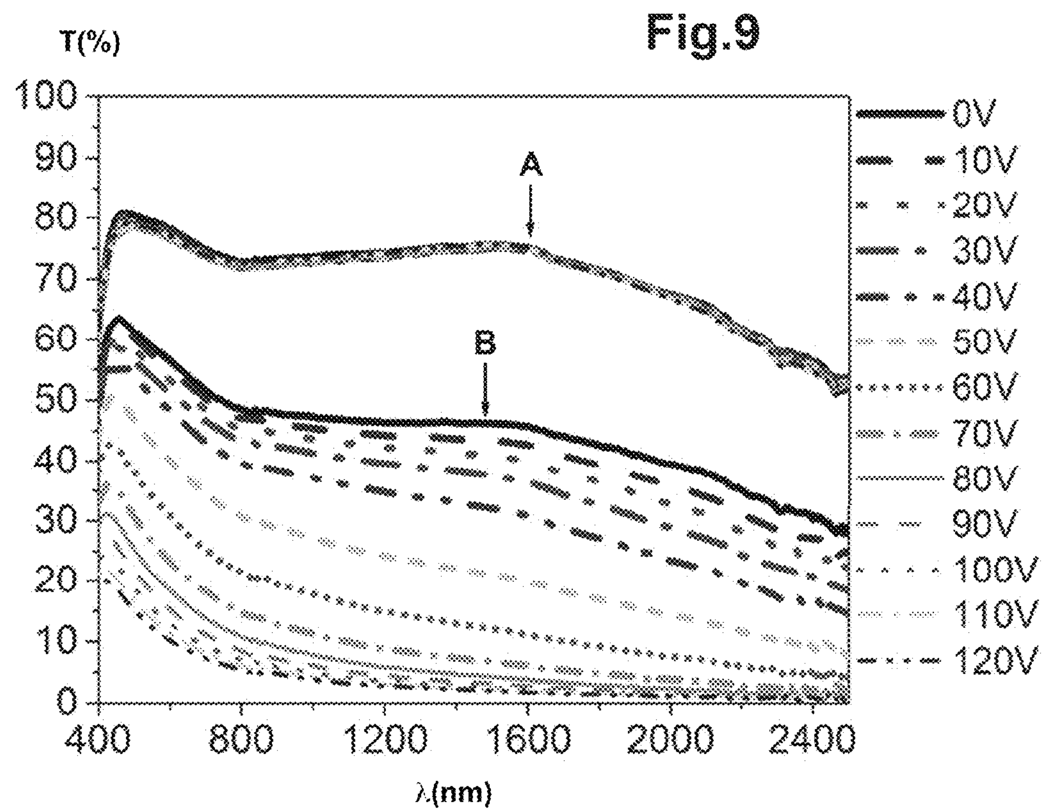

FIG. 9 shows an assembly A of curves corresponding to the total transmission as a function of the wavelength between 400 and 2500 nm approximately without electric field or under electric field normal to the electroactive layer with a voltage of 10V to 120V per step of 10V for the device of FIG. 1 and an assembly of curves B corresponding to the diffuse transmission as a function of the wavelength between 400 and 2500 nm approximately without electric field or under electric field normal to the electroactive layer with a voltage of 10V to 120V per step of 10V for the device of FIG. 1

Figure 10:
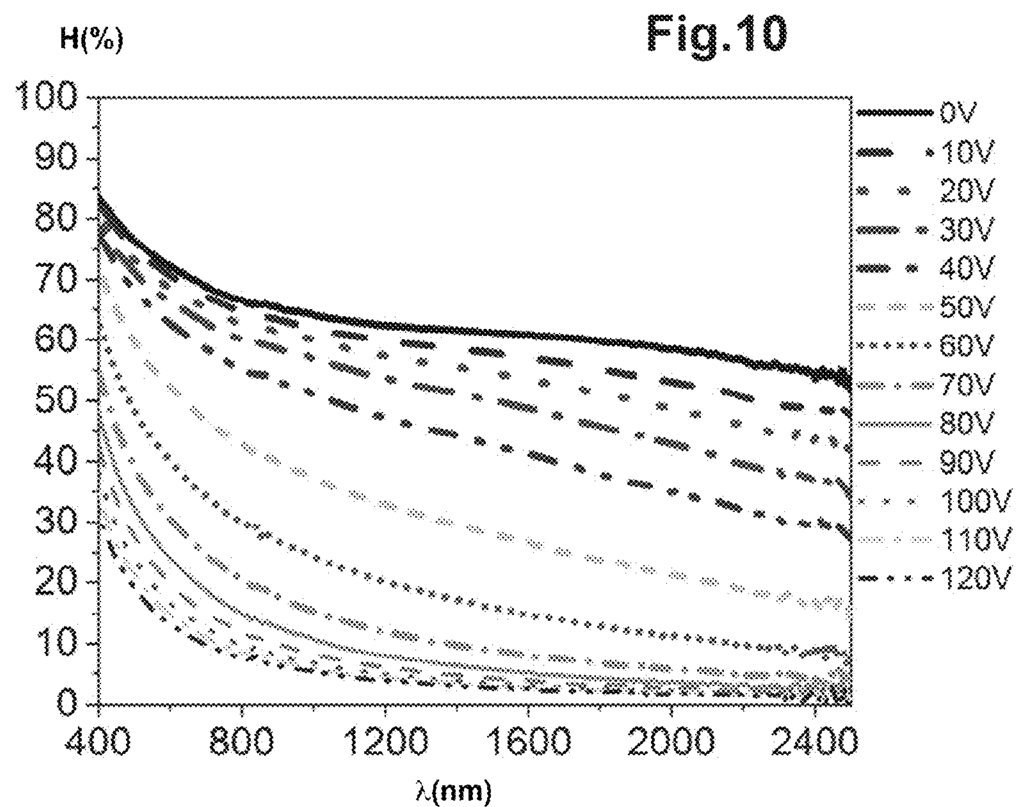

FIG. 10 shows an assembly of curves corresponding to the haze H (expressed in %), which is the ratio of the diffuse transmission DT to the total transmission TT, as a function of the wavelength between 400 and 2500 nm approximately without electric field or under electric field normal to the electroactive layer with a voltage of 10V to 120V per step of 10V and an assembly of curves B corresponding to the diffuse transmission as a function of the wavelength between 400 and 2500 nm approximately without electric field or under electric field normal to the electroactive layer with a voltage of 10V to 120V per step of 10V for the device of FIG. 1

Figure 11:
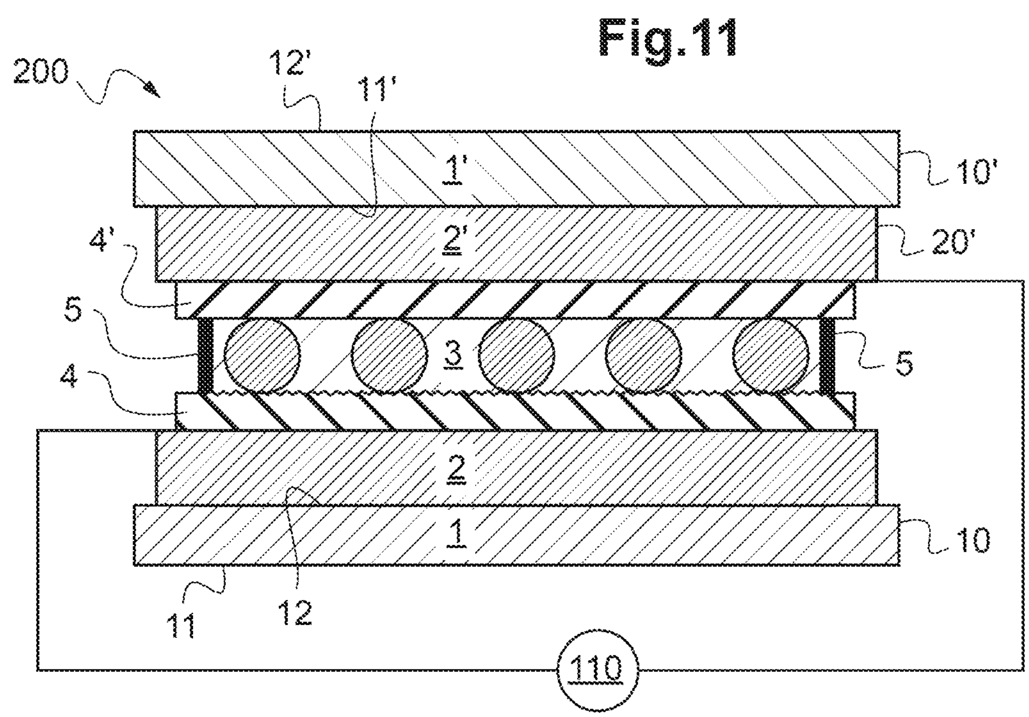
Figure 12A:
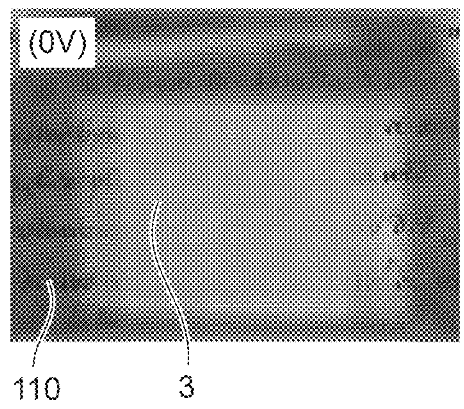
Figure 12B:
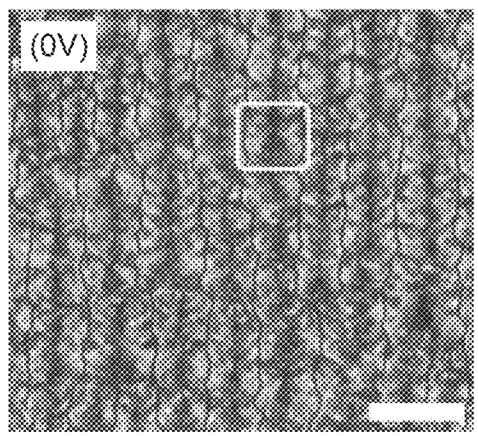
Figure 13A:
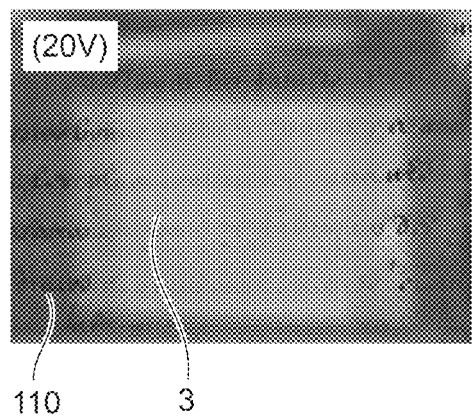
Figure 13B:
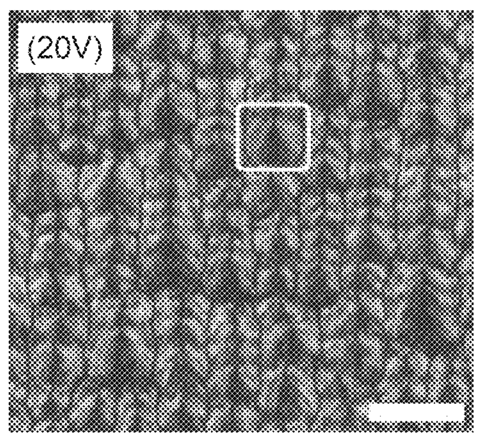
Figure 14A:
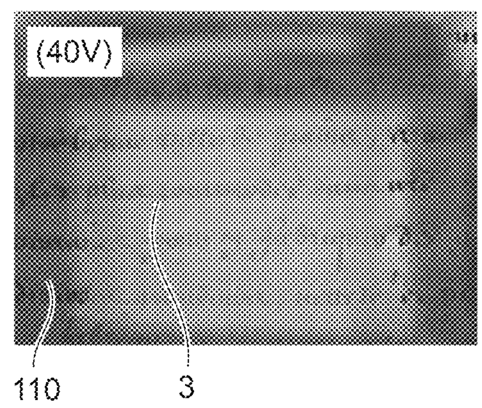
Figure 14B:
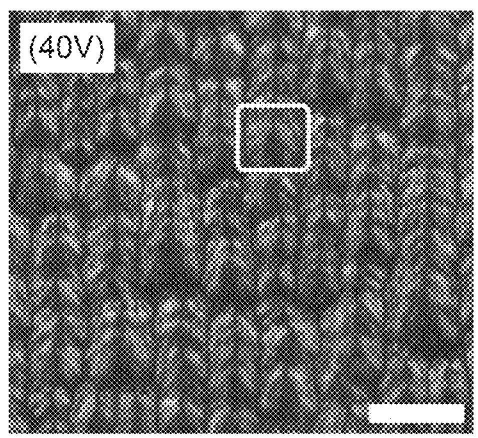
Figure 15A:
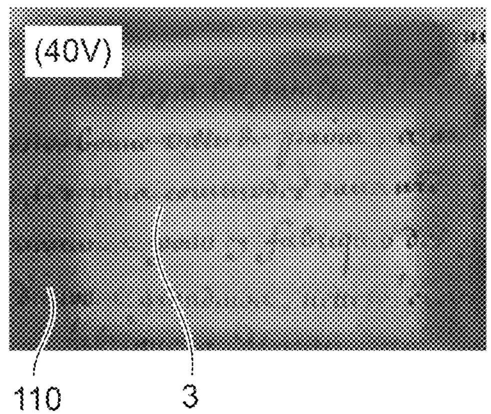
Figure 15B:
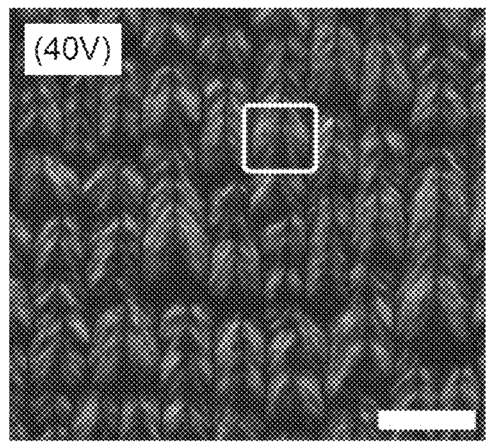
Figure 16A:
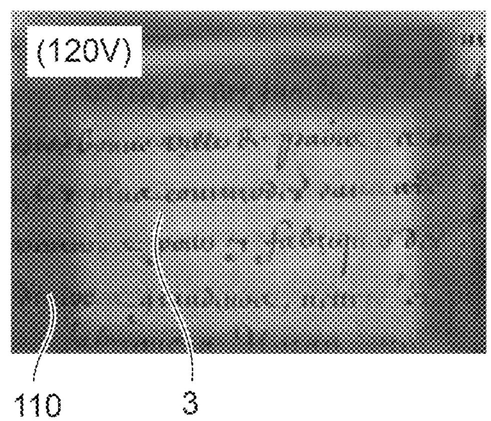
Figure 16B:
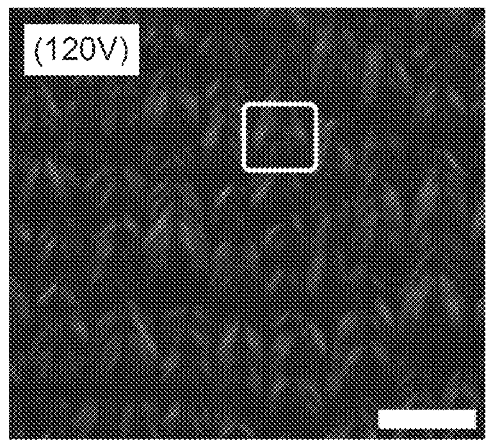
Figure 17A:
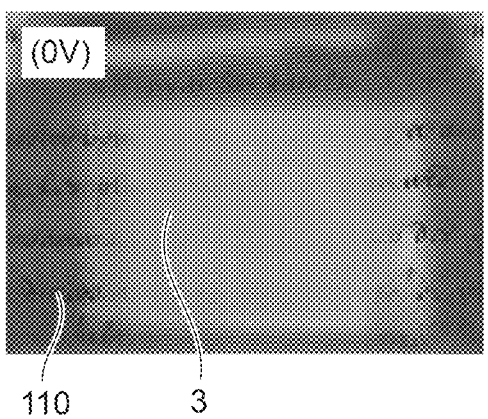
Figure 17B:
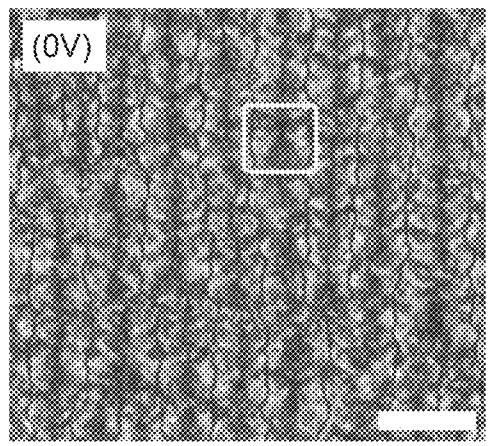

FIG. 11 represents a diagrammatic sectional view of a device having scattering which can be varied by liquid crystals 200 in a second embodiment of the invention FIGS. 12*a* to 17*a* respectively show images, in black and white, of the electrically controllable device of FIG. 11 in a light booth with a backdrop 110 (paper with lines of writing) at 20 cm and under illuminant D65 in the absence of electric field (12*a*), for an electric field normal to the electroactive layer with a voltage of 20V (13*a*), of 40V (14*a*), of 70V (15*a*), of 120V (16*a*), and back to 0V (17*a*)

FIGS. 12*b* to 17*b* respectively show images (in black and white) obtained by polarized light optical microscopy (PLM) under a magnification of 20 (with a scale in white line of 50 μm), images showing the domains having line defects of the electroactive layer of the electrically controllable device of FIG. 11 in the absence of electric field (12*b*), for an electric field normal to the electroactive layer with a voltage of 20V (13*b*), of 40V (14*b*), of 70V (15*b*), of 120V (16*b*), and back to 0V (17*b*)

Figure 18:
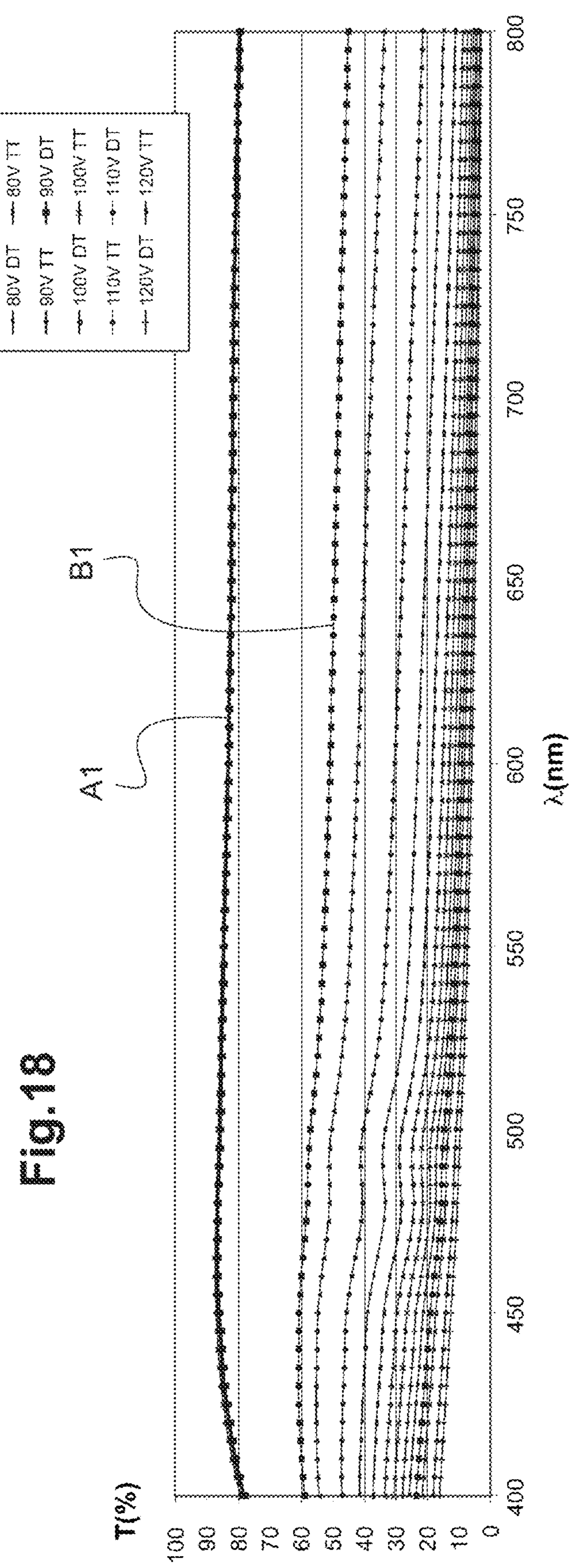

FIG. 18 shows an assembly A1 of curves corresponding to the total transmission as a function of the wavelength between 400 and 800 nm approximately without electric field or under electric field normal to the electroactive layer with a voltage of 10V to 120V per step of 10V for the device of FIG. 11 and an assembly of curves B1 corresponding to the diffuse transmission as a function of the wavelength between 400 and 2500 nm approximately without electric field or under electric field normal to the electroactive layer with a voltage of 10V to 120V per step of 10V for the device of FIG. 11

Figure 19:
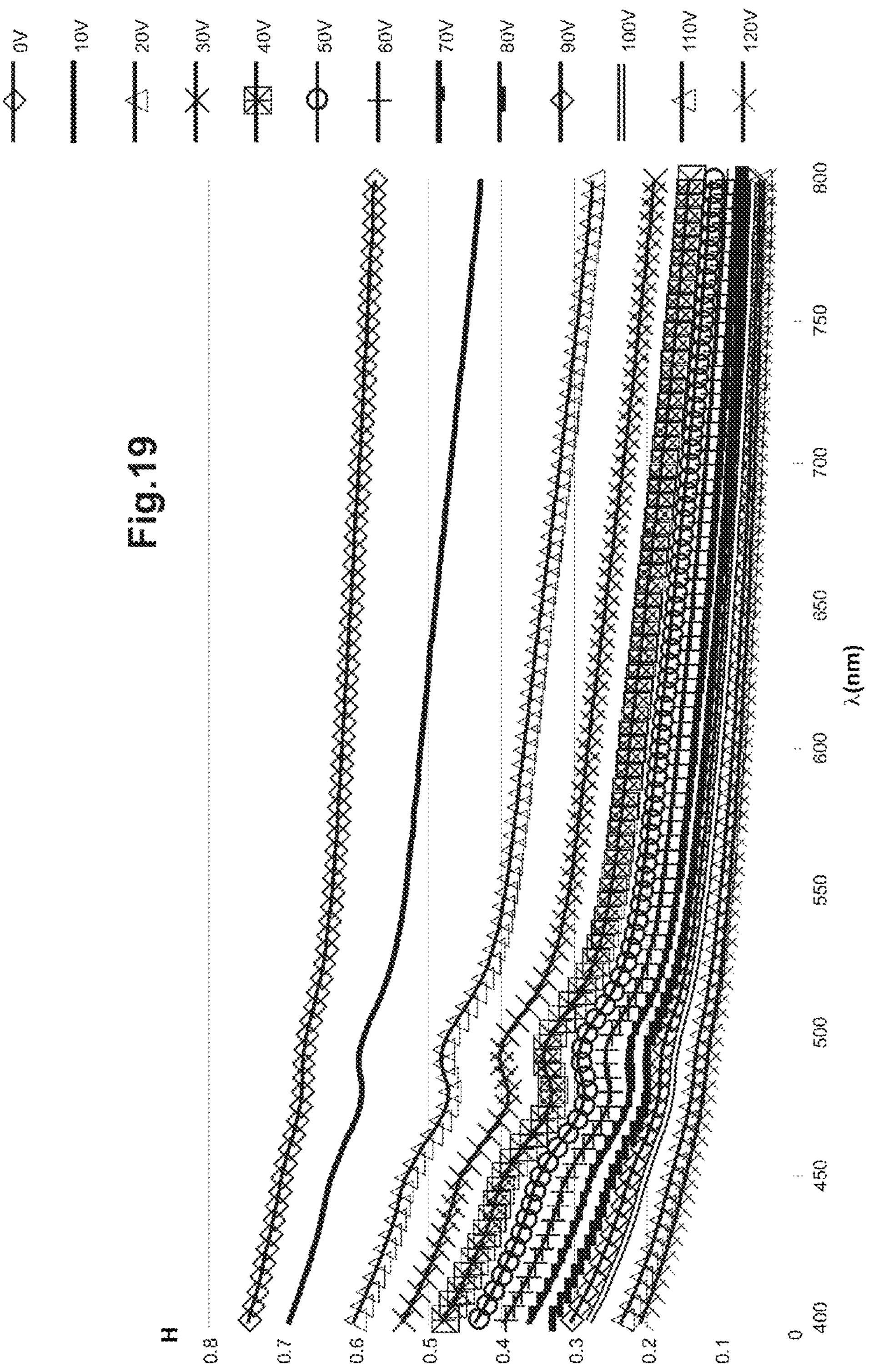

FIG. 19 shows an assembly of curves corresponding to the haze H, which is the ratio of the diffuse transmission DT to the total transmission TT, as a function of the wavelength between 400 and 2500 nm approximately without electric field or under electric field normal to the electroactive layer with a voltage of 10V to 120V per step of 10V for the device of FIG. 11 and an assembly of curves B corresponding to the diffuse transmission as a function of the wavelength between 400 and 2500 nm approximately without electric field or under electric field normal to the electroactive layer with a voltage of 10V to 120V per step of 10V for the device of FIG. 11

Figure 20:
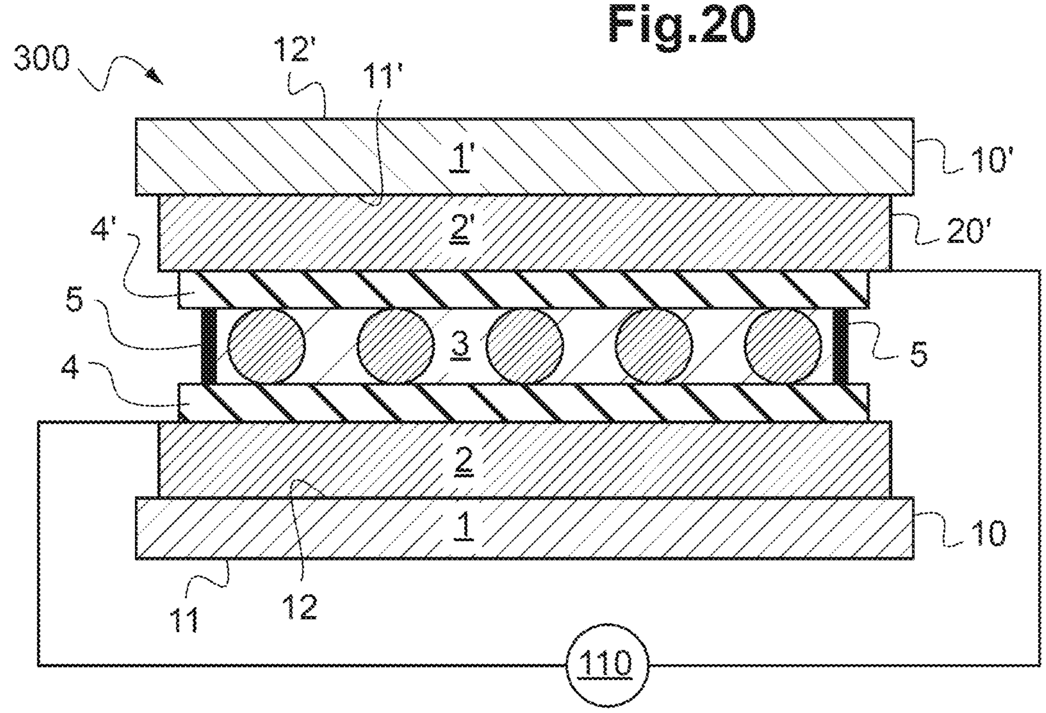
Figure 21:
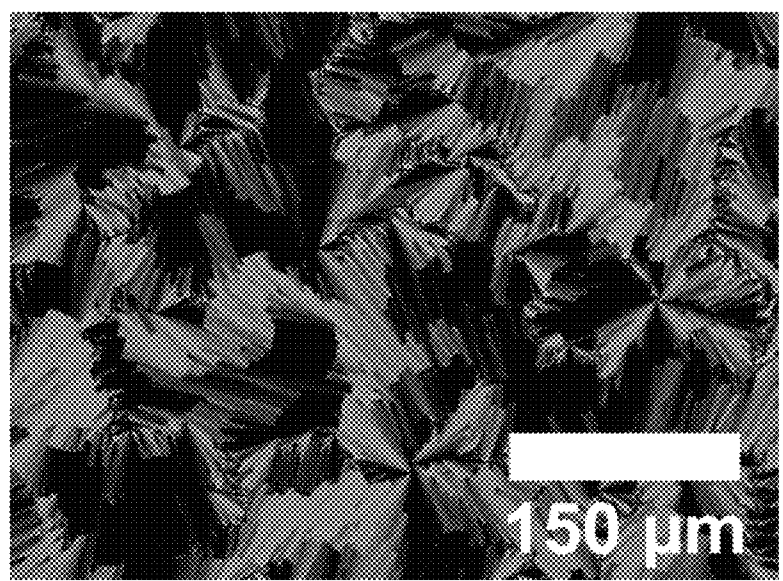
Figure 22:
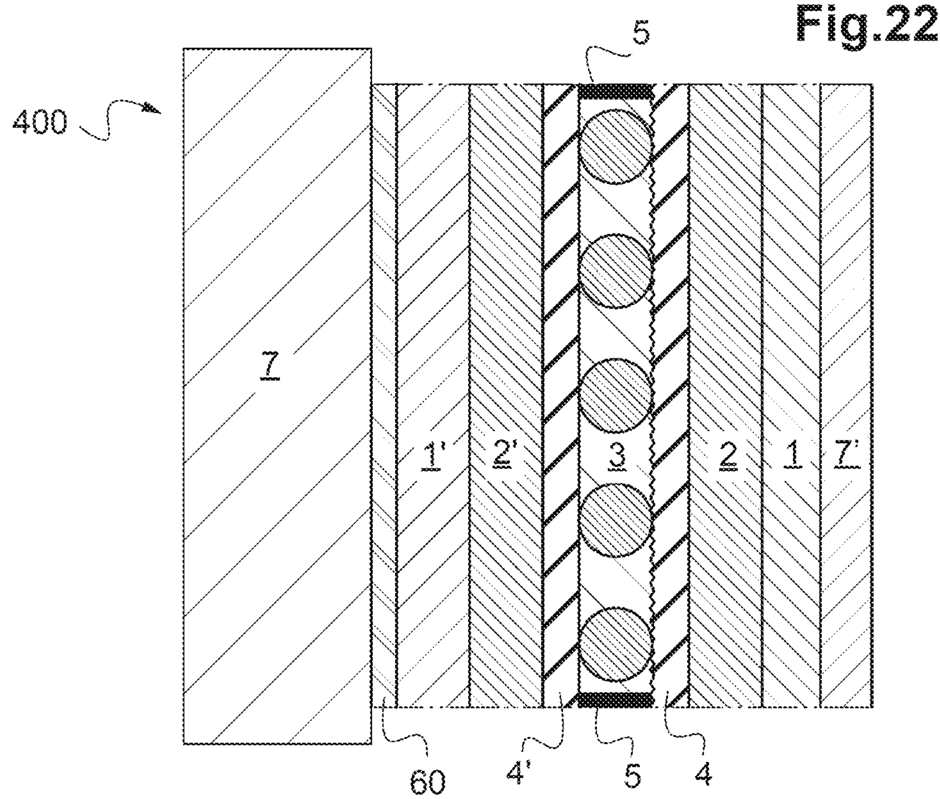
Figure 23:
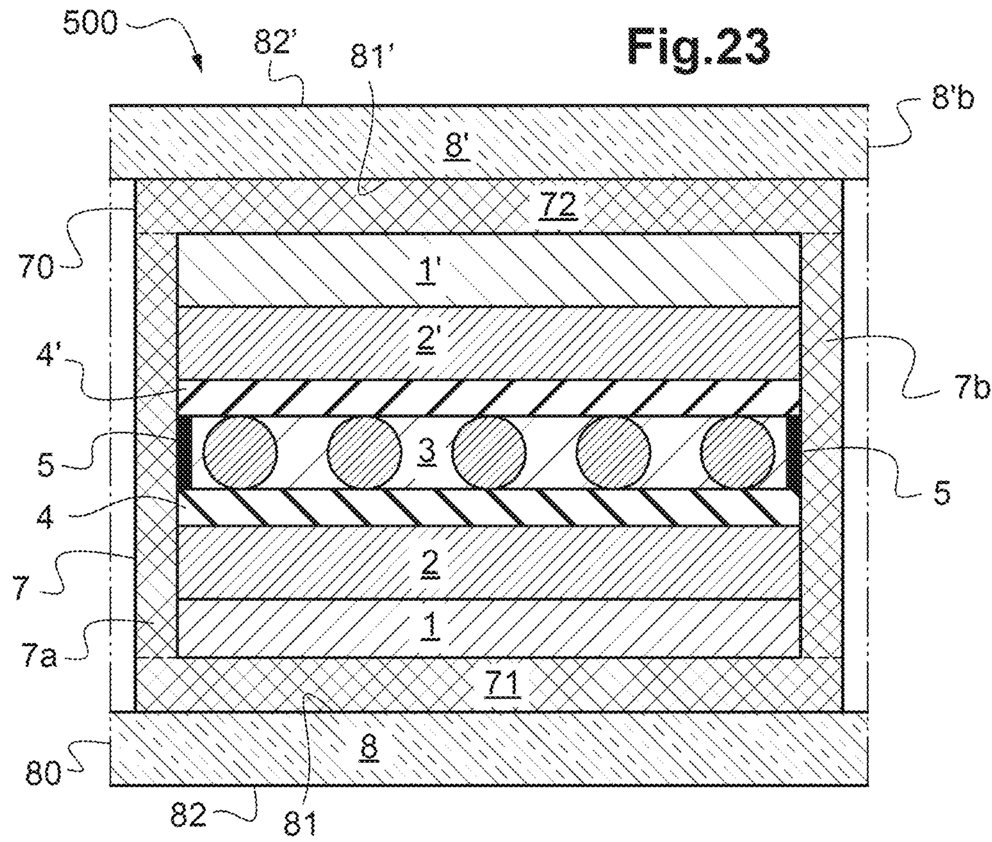
Figure 24A:
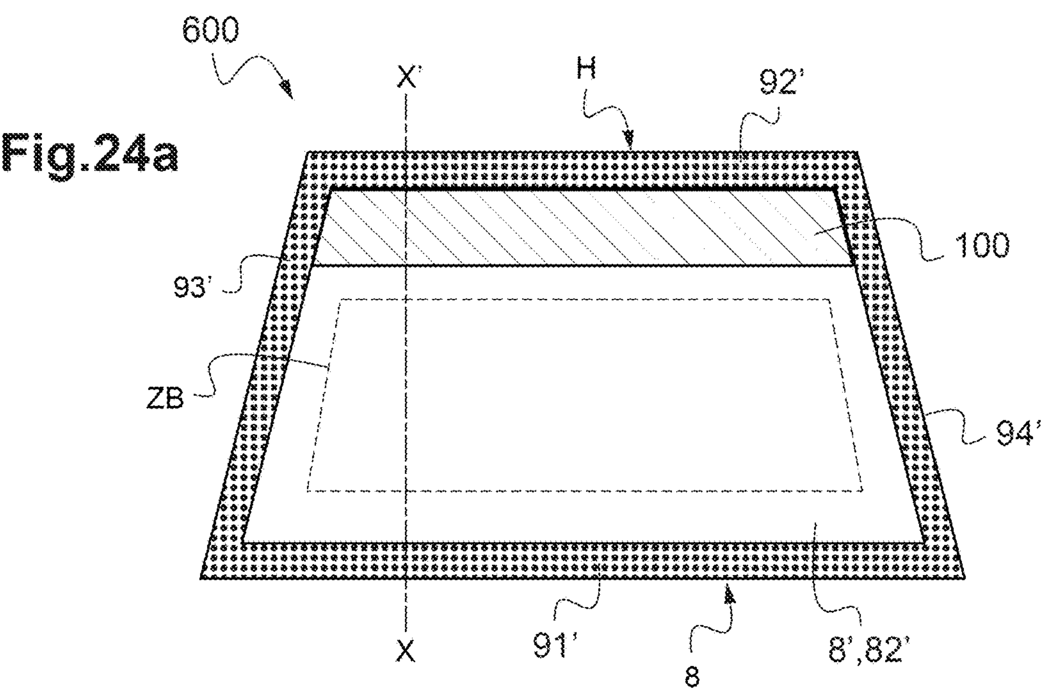
Figure 24B:
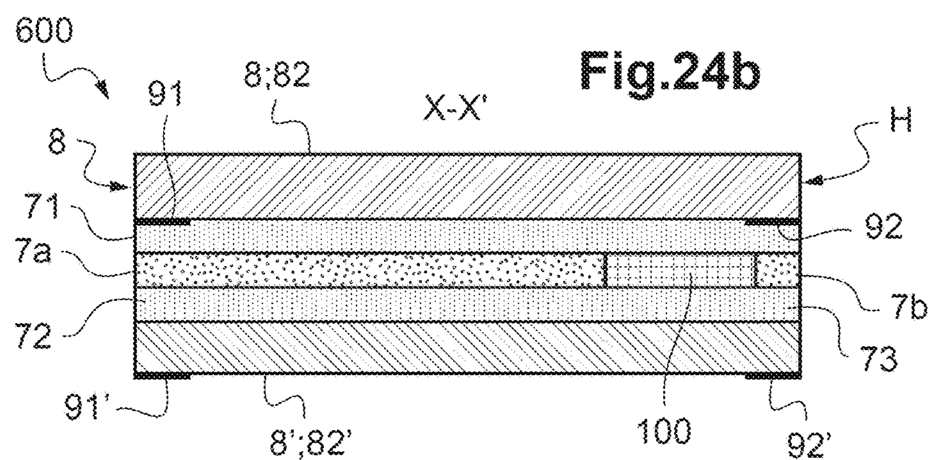
Figure 25:
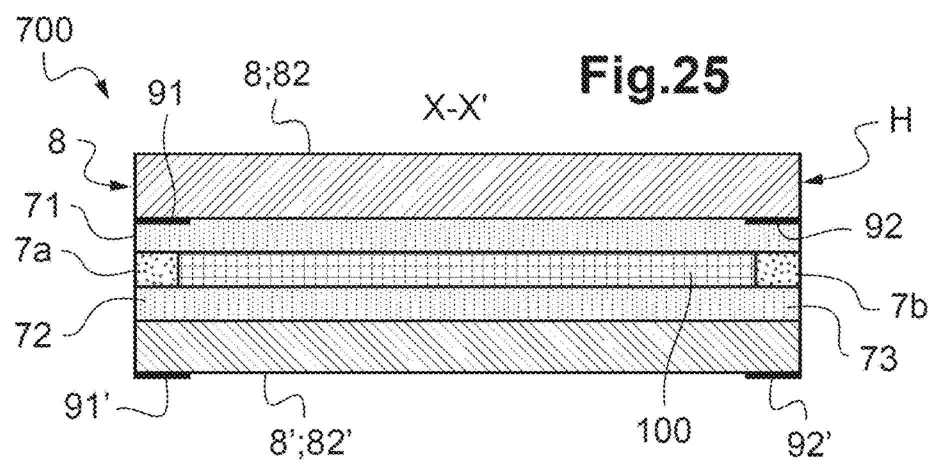

FIG. 20 represents a diagrammatic sectional view of a device having scattering which can be varied by liquid crystals 300 in a third embodiment of the invention FIG. 21 shows an image (in black and white) obtained by polarized light optical microscopy (PLM) under a magnification of 20 (with a scale in white line of 150 μm), image showing the domains having line defects of fan-shaped type of the electroactive layer of the electrically controllable device of FIG. 20 in the absence of electric field FIG. 22 represents a diagrammatic sectional view of a device having scattering which can be varied by liquid crystals 400 in a fourth embodiment of the invention FIG. 22 represents a diagrammatic sectional view of a device having scattering which can be varied by liquid crystals 400 in a fourth embodiment of the invention FIG. 23 represents a diagrammatic sectional view of a device having scattering which can be varied by liquid crystals 500 in a fifth embodiment of the invention FIGS. 24*a* and 24*b* respectively represent a diagrammatic front and sectional view of a device having scattering which can be varied by liquid crystals 600 in a sixth embodiment of the invention FIG. 25 represents a diagrammatic sectional view of a device having scattering which can be varied by liquid crystals 700 in a seventh embodiment of the invention.

The elements in the figures are not represented to scale.

EXAMPLE 1

Exemplary embodiment No. 1 represented in FIG. 1 shows an electrically controllable device having scattering which can be varied by liquid crystals 100 according to the invention which comprises a stack of layers in this order:

- a transparent dielectric substrate 1 with an edge face 10 and main faces 11 and 12 and comprising a first transparent electrode 2 with a first main surface referred to as bonding surface and a surface referred to as opposite surface Sb and an edge face 10, in this instance a glass of 1.1 mm—or, in an alternate form, plastic, such as PET—with an ITO layer with a sheet resistance of 10 ohm/square, more broadly between 5 and 300 ohm/square, and for a neutrality in colors; this electrode or each electrode can also comprise at least two thin dielectric underlayers under the ITO layer and even one or two (dielectric) overlayers
- a transparent (in this instance degenerate) planar first anchoring layer 4 on the first electrode 2
  - in contact with the first anchoring layer 4, a dielectric electroactive layer 3 with a main face referred to as face on the bonding surface side and a main face referred to as opposite face A2, in this instance with a thickness of 6 μm, made of a material comprising: liquid crystals
  - polymers forming a polymeric network, the liquid crystals being stabilized by the polymeric network
- the material exhibiting, starting from a temperature referred to as T1, a mesophase referred to as P in which the material comprises an assembly of domains, in this instance submillimetric, which comprise two-dimensional topological defects, such as line defects
- spacers being distributed in the material, in this instance glass beads
- the layer being sealed at the periphery by a polymeric seal 5, for example made of epoxy, of acrylate, in this instance of cyanoacrylate
- a transparent second anchoring layer 4', in this instance a normal anchoring layer
  - a second transparent electrode 2' with on the side of face A2 a main surface referred to as second bonding surface and with a surface referred to as opposite surface Sc, in particular second electrode which is an ITO layer with a sheet resistance of 10 ohm/square, more broadly between 5 and 300 ohm/square, and for a neutrality in colors; this or each electrode can also comprise at least two thin dielectric underlayers under the ITO layer and even one or two overlayers
- a transparent dielectric support 1' of the second electrode 2' with an edge face 10' and main faces 11' and 12', in this instance a glass of 1.1 mm—or, in an alternative form, plastic, such as PET.

In order to supply electricity via a source 110, conductive bands (not shown), in particular metallic conductive bands, for example made of copper, are fixed, for example by adhesive bonding, along and on peripheral edges and are in contact with the electrodes 2,2' (one band per electrode, the bands preferably being on opposite edges). These bands are subsequently connected to an electrical supply.

The edge faces 20,20' of the electrodes 2,2' and the edge of the electroactive layer are preferably set back with respect to the edges 10,10' of the glasses 1,1'.

The glasses 1,1' are rectangular but can be of any shape, for example round or square, and of any size, for example with a length of at least 1 m and even with a width of at least 10 cm (strip, and the like). The thicknesses can, for example, be from 0.7 mm to 4 mm. They can have a thickness preferably of greater than 100 μm and of at most 300 μm for better mechanical strength of the assembly and/or for ease of processing or of handling but, if greater flexibility is desired, it is possible to go down, for example, to 50 μm.

In the "OFF" state, that is to say before the application of an electric voltage, this glazing having liquid crystals 100 is scattering, that is to say that it transmits optically but is not transparent. As soon as a voltage is applied between the two electrodes, the layer 3 changes to the less scattering state with a variable level of scattering which depends on the voltage.

Under said electric field, the stack exhibits a diffuse transmission and a haze which varies with the voltage, in this instance between 5V and 120V.

In an alternative to the choice of ITO, alone or in a multilayer, a silver-containing stack is chosen for one or both electrodes. It is even possible to choose, for one of the electrodes, a layer with a lower $T_L$ or even a reflecting layer.

One or the external faces of the first and second carrier substrates 1,1' can comprise one or more functional layers (antireflective, and the like) already known.

One of the first and second carrier substrates 1,1', and even the associated electrode, can be greater in size than the remainder of the stack. For example, the electrically conductive layer 2 or 2', such as ITO (or other), can act as solar control layer. The ITO region acting as electrode can then be isolated by laser etching, for example, in order to form an ITO strip.

One and/or other of the glasses 1,1' can be replaced by a polymeric sheet, for example PET, of at most 500 μm or 200 μm, with or without a layer on its external face, or else by a plastic sheet—with or without a layer on its external face—for example thicker (such as from 1 to 10 mm), a polycarbonate or else a PMMA.

The manufacturing process of example No. 1 is described more precisely below.

The first anchoring layer 4 is a layer of poly(vinyl alcohol) (PVOH; Sigma-Aldrich; molecular weight $M_w$~27 kDa) of approximately 300 nm, bringing about a (degenerate) planar anchoring of the liquid crystals at the surface (without field), The PVOH layer is deposited on the first ITO layer 2 by spin coating with a solution of PVOH in deionized water (9.1% by weight). Before the deposition, the ITO is cleaned with ethanol and dried under nitrogen.

The second anchoring layer 4' is a layer of octyltrichlorosilane (OTS), bringing about a normal (homeotropic) anchoring of the liquid crystals at the surface (without field). It is obtained by immersion of the glass with the second ITO 2' in a solution of OTS in n-heptane for 30 minutes, rinsing with deionized water and drying under nitrogen.

In order to produce the electroactive layer 3, a mixture with two types of liquid crystals 5CB and 8CB, a monomer and a photoinitiator is formed.

The mixture contains:

98% by weight of the liquid crystals 5CB and 8CB in a ratio 1:4

2% by weight of the combination formed by the monomer bisphenol A dimethacrylate with a photoinitiator 2,2-dimethoxy-2-phenylacetophenone.

The mixture exhibits a smectic A mesophase under 17.5° C. and a nematic mesophase between 17.5° C. and 38° C. (and an isotropic phase above).

A layer of this mixture is formed between the anchoring layers 4 and 4'.

Subsequently, the combination is illuminated under UV radiation (λ, =365 nm) for polymerization at 5° C. (or at least under 17.5° C.), thus in smectic A phase.

The electroactive layer 3 then comprises, in nematic phase, domains which are comparable to the focal conic domains of the smectic A phases, in particular in this instance toric focal conic domains or TFCDs.

FIGS. 2*a* and 2*c* represent a diagrammatic and detailed sectional view of an electroactive layer of the device having scattering which can be varied by liquid crystals of the type of FIG. 1, without electric field or under electric field, FIG. 2*b* illustrating simply the orientation of some liquid crystals under electric field.

The layer 3 in nematic phase exhibits smectic defects of TFCD type.

It is considered that FIG. 2*a* represents a single focal conic domain of TFCD type.

FIGS. 2*a* and 2*c* show a structure as layers 33 of liquid crystals 31, 31*a*, 31*b*, 310 imposed by the polymeric network (not represented).

The layers are curved in the direction of the (in this instance degenerate) planar anchoring layer in a central zone 34 and the layers are flat and parallel with one another over two lateral zones 35, 35' which are more or less extensive and which may be nonexistent.

The domain exhibits a line defect in the plane of the glass 1, such as a surface with a closed contour of circular type (more or less irregular), and another line defect which has a linear geometry 36.

On the side of the planar anchoring layer (lower part), some liquid crystals (short rods) 31*a* are parallel to this layer along all the directions of the plane.

On the side of the normal anchoring layer (upper part), some liquid crystals 31*b* are perpendicular to this layer.

Outside the contact zone with the planar anchoring layer 4, without electric field, for example at the middle of the thickness of the layer 3, the liquid crystals 310 have an orientation normal to the layers 4 and 4'.

For example, the liquid crystals have a first orientation along an oblique angle with respect to the axis Z (in the vertical field E) without electric field in the curved zone and then become closer to the axis Z (of the field) when the field is applied (cf FIG. 2*b*), for example 25V.

FIG. 2*c* shows the case where (virtually) all the liquid crystals are aligned vertically, for example starting from 120V, indeed even 150V.

FIGS. 3*a* to 7*a* show images (in black and white) of the electrically controllable device of FIG. 1 in a light booth with a backdrop 110 (paper with lines of writing) at 20 cm and under illuminant D65 in the absence of electric field (3*a*), for an electric field normal to the electroactive layer 3 with a voltage of 25V (4*a*), of 50V (5*a*), of 70V (6*a*), and back to 0V (7*a*). The temperature is 21° C., thus in the nematic phase with smectic A defects.

FIGS. 3*b* to 7*b* show images (in black and white) obtained by polarized light optical microscopy (PLM) under a magnification of 20 (with a scale in white line of 50 μm), images showing the domains having line defects of the electroactive layer 3 of the electrically controllable device of FIG. 1 in the absence of electric field (3*b*), for an electric field normal to the electroactive layer 3 with a voltage of 25V (4*b*), of 50V (5*b*), of 70V (6*b*), and back to 0V (7*b*). The temperature is 21° C.

The domains are characterized by polarized light optical microscopy, referred to as PLM, on the image of said PLM, each domain being defined by a surface referred to as apparent surface SD.

The domains are of polydisperse surface SD (contours more visible under a low-voltage field, for example at 25V).

1104 defects are counted in a rectangle with a length of 324 μm and with a width of 167 μm, i.e. 1922 domains·mm$^2$.

Figure 7A:
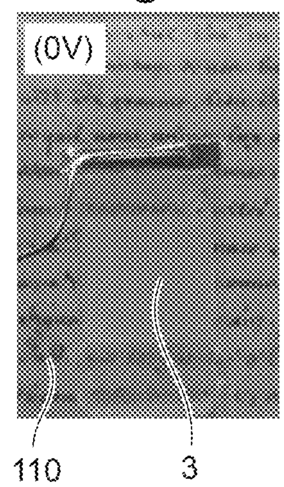
Figure 7B:
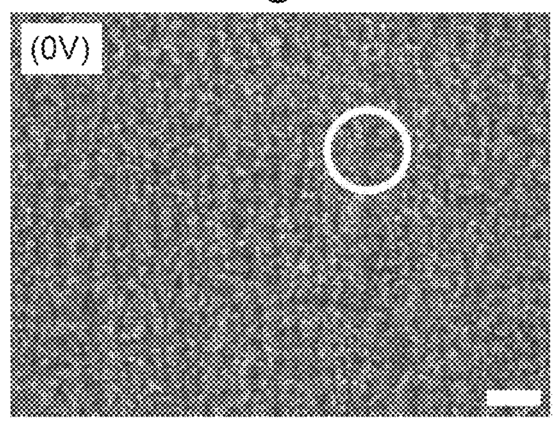

FIGS. 7*a* and 7*b* testify to the reversibility from the most transparent state to the most scattering state (without electric field).

The more the voltage is increased, the better the writing is distinguished from the backdrop 110.

FIG. 8 shows:

an assembly A of curves corresponding to the total transmission TT as a function of the wavelength between 400 and 800 nm without electric field or under electric field normal to the electroactive layer with a voltage of 10V to 110V per step of 10V for the device of FIG. 1 and an assembly of curves B corresponding to the diffuse transmission DT as a function of the wavelength between 400 and 800 nm without electric field or under electric field normal to the electroactive layer with a voltage of 10V to 110V per step of 10V for the device of FIG. 1.

The stack exhibits, in this instance, a total transmission TT of at least 70% from 450 to 800 nm (and even at 75% from 450 nm to 600 nm), with a difference between the maximum total transmission and the minimum total transmission TTmax-TTmin of at most 5% from 450 to 600 nm.

The total transmission TT remains fairly constant even with an electric field (and for any voltage level).

The total transmission TT over the wavelength range 400-2500 nm is (virtually) independent of the switching voltage.

It is possible to reduce the absorption in particular caused by the ITO layers.

On the other hand, its is well and truly observed that the diffuse transmission DT (curves B) varies and gradually decreases as the voltage increases for each wavelength. Thus, it is shown very quantitatively that the diffuse transmission is adjustable with the voltage. For example, DT passes from approximately 10% to 55% at 600 nm on passing from 120V to 0V.

FIG. 9 shows the same curves as FIG. 8 but up to 2500 nm.

The total transmission TT remains fairly constant even with an electric field (every voltage level) between 800 nm and 1500 nm.

The total transmission TT over the wavelength range 400-2500 nm is (virtually) independent of the switching voltage.

On the other hand, it is also observed that the diffuse transmission DT (curves B) varies and gradually decreases as the voltage increases.

FIG. 10 shows an assembly of curves corresponding to the haze H (expressed in %), which is the ratio of the diffuse transmission DT to the total transmission TT, as a function of the wavelength between 400 and 2500 nm approximately without electric field or under electric field normal to the electroactive layer with a voltage of 10V to 120V per step of 10V and an assembly of curves B corresponding to the diffuse transmission as a function of the wavelength between 400 and 2500 nm approximately without electric field or under electric field normal to the electroactive layer with a voltage of 10V to 120V per step of 10V for the device of FIG. 1.

EXAMPLE 2

FIG. 11 represents a diagrammatic sectional view of a device having scattering which can be varied by liquid crystals 200 in a second embodiment of the invention which differs from the first embodiment 100 in that the planar first anchoring layer PVOH 4 is rubbed with velvet for a directional planar anchoring.

The line defects are then referred to as non-TFCD or square TFCD.

FIGS. 12*a* to 17*a* show images, in black and white, of the electrically controllable device of FIG. 11 in a light booth with a backdrop 110 (paper with lines of writing) at 20 cm and under illuminant D65 in the absence of electric field (12*a*), for an electric field normal to the electroactive layer with a voltage of 20V (13*a*), of 40V (14*a*), of 70V (15*a*), of 120V (16*a*), and back to 0V (17*a*).

FIGS. 12*b* to 17*b* show the images (in black and white) obtained by polarized light optical microscopy (PLM) under a magnification of 20 (with a scale in white line of 50 μm), images showing the domains having line defects of the electroactive layer of the electrically controllable device of FIG. 11 in the absence of electric field (12*b*), for an electric field normal to the electroactive layer with a voltage of 20V (13*b*), of 40V (14*b*), of 70V (15*b*), of 120V (16*b*), and back to 0V (17*b*).

The domains are arranged more regularly than for example 1 and are less polydisperse. The analyses on the influence of the applied field on the scattering, the diffuse transmission, and the total transmission are analogous to those of example 1.

2400 domains per $mm^2$ are counted.

FIG. 18 shows:

- an assembly A1 of curves corresponding to the total transmission as a function of the wavelength between 400 and 800 nm approximately without electric field or under electric field normal to the electroactive layer with a voltage of 10V to 120V per step of 10V for the device of FIG. 11,
- and an assembly of curves B1 corresponding to the diffuse transmission as a function of the wavelength between 400 and 800 nm approximately without electric field or under electric field normal to the electroactive layer with a voltage of 10V to 120V per step of 10V for the device of FIG. 11.

The look of the curves is similar to those of FIG. 18.

FIG. 19 shows:

- an assembly of curves corresponding to the haze H, which is the ratio of the diffuse transmission DT to the total transmission TT as a function of the wavelength between 400 and 2500 nm approximately without electric field or under electric field normal to the electroactive layer with a voltage of 10V to 120V per step of 10V for the device of FIG. 11
- and an assembly of curves B corresponding to the diffuse transmission as a function of the wavelength between 400 and 2500 nm approximately without electric field or under electric field normal to the electroactive layer with a voltage of 10V to 120V per step of 10V for the device of FIG. 11.

The analyses on the influence of the applied field on the scattering, the diffuse transmission, the total transmission and are analogous to those of example 1.

EXAMPLE 3

FIG. 20 represents a diagrammatic sectional view of a device having scattering which can be varied by liquid crystals 300 in a third embodiment of the invention which differs from the first embodiment 100 in that the second anchoring layer becomes a (degenerate) planar anchoring layer 4' and in this instance is identical to the planar first anchoring layer PVOH.

FIG. 21 shows an image (in black and white) obtained by polarized light optical microscopy (PLM) under a magnification of 20 (with a scale in white line of 150 μm), image showing the domains having line defects of fan-shaped type of the electroactive layer of the electrically controllable device of FIG. 20 in the absence of electric field. The line defects are of fan-shaped FCD type.

Assemblage Examples

FIG. 22 represents a diagrammatic sectional view of a device having scattering which can be varied by liquid crystals 400 in a fourth embodiment of the invention which differs from the first embodiment 100 in that:

- the glasses 1 and 1' are replaced by PETs 1,1'
- and the stack is adhesively bonded by an optical adhesive 60 to an element 7, such as a glass 7 or rigid plastic, for example.

For example, a partition is concerned (vertical position).

The assembly can form part of a multiple glazing (double or triple glazing).

For a double glazing, the stack can be side face 1 (exterior face), 2, 3; 4 (interior face). The stack of the device 400 can be flexible, can fit the curvatures of the added element 7.

For a triple glazing, the stack can be side face 1 (exterior face), 2, 3; 4, 5, 6 (exterior face).

The element 7 can be of the same size as or greater in size than the stack.

The stack can be:

- on the preferably external face of a shower wall,
- on the preferably internal face (face "F4") of a bent glazing of a vehicle, in particular an automobile: roof, side window, windshield, rear window.

In particular, the device 400 can act as projection screen.

FIG. 23 represents a diagrammatic sectional view of a device having scattering which can be varied by liquid crystals 500 in a fifth embodiment of the invention which comprises the first device 100 (glasses 1,1' optionally replaced by PET films, for example) in a laminated glazing, that is to say in a lamination interlayer 7, for example PVB or EVA, which is submillimetric or of at most 2 mm, between a first and a second glazing 8,8', for example of rectangular (or more broadly quadrilateral, polygonal) general shape with identical or similar dimensions, for example with a thickness of at most 5 mm or 3 mm, with internal main faces 81,81' on the interlayer side and external main faces 82,82'.

During manufacture, it is possible to use three interlayer sheets: two full sheets 71,72 against the internal faces 81, 81' of the glazings 8,8' and a central sheet with an opening for housing the stack of FIG. 1. After lamination, the interface between sheets (symbolized in dotted lines) is not necessarily discernible. It is preferable for the opening to be closed rather than completely emerging on one side. Thus, the entire edge of the stack is surrounded with lamination interlayer 7. Naturally, for the electrical supply, connections can exit from the device 500 and even protrude over one or more sides of the edges of the glazings.

Alternatively, it is possible to use two interlayer sheets 71,72, the central hollowed-out sheet not being necessary if the stack is sufficiently thin, for example with a thickness of at most 0.2 mm.

The first glazing 8 or 8' can be tinted (gray, green, bronze, and the like) and the other glazing 8' or 8 clear or extra-clear. A first interlayer sheet can be tinted (gray, green, bronze, and the like) and the other(s) clear or extra-clear. One of the first glazings 8 or 8' can be replaced by a plastic sheet, such as a polycarbonate or a PMMA (in particular with a lamination interlayer made of PU).

The edge 70 of the lamination interlayer can be set back (by at most 5 mm, for example) from the edge 80, 80' of the glazings 8,8'.

The device 500 covers virtually the whole of the main faces of the glasses 8 and even in this instance is centered. There is the same width of PVB 7*a*,7*b* on either side of the device 500.

The glazings 8,8' are flat or bent, it being possible for the device 500 to fit the curvature or curvatures of the glazings.

The device 500 can be a partition or else a vehicle roof. For example, for an automobile roof:

- the glazing 8 is the bent exterior glazing, which is a tinted glazing of 3 mm
- the glazing 8' is the bent interior glazing, which is a clear glazing of 3 mm or thinner
- the lamination interlayer 7 is made of PVB, which can be acoustic, in particular bilayer or trilayer (sheet 71 or 72).

FIGS. 24*a* and 24*b* respectively represent a diagrammatic front and sectional view of a device having scattering which can be varied by liquid crystals 600 in a sixth embodiment of the invention.

The device 600 differs from the device 100 in that the stack of FIG. 1 100 covers a surface portion, in particular a peripheral strip, for example along an upper longitudinal edge H of an automobile vehicle windshield (bent laminated glazing with the device 100), over virtually the whole length of the windshield.

This strip 100 is in a marginal zone in which the criteria of $T_L$ and of absence of haze are looser than in the central zone ZB.

As shown in FIG. 24*b* (sectional view), the width 7*a* of central interlayer 73 between the device 200 and the lower longitudinal edge B is greater than the width 7*b* of central interlayer 73 between the device 600 and the upper longitudinal edge H.

In an alternative form or simultaneously, it can be present along a lower longitudinal edge B of the windshield, over the entire length or a portion of length.

As shown in FIG. 24*a* (front view, interior side of the vehicle), the windshield comprises a first opaque frame, for example made of enamel (black or other), 91' to 94' over the lateral and longitudinal edges of the free face (F4) 82' of the internal glazing 8' and a second opaque frame, for example made of enamel (black or other), 91 to 94 over the lateral and longitudinal edges of the free face (F1) 82 of the external glazing 8.

The edge face of the device 600, which is on the side of the lower longitudinal edge, and even those on the side of the lateral edges, can be (opposite) between the layers 92, 92', 93, 93', 94, 94' of the enamel frames. For example, the connections and other strips for conveying current can also be masked by these layers 92, 92', 93, 93', 94, 94'.

FIG. 25 represents a diagrammatic sectional view of a device having scattering which can be varied by liquid crystals 700 in a seventh embodiment of the invention which differs from the last embodiment 600 in that it concerns an automobile roof, for example with the external glass 8 is tinted and/or the PVB 71 is tinted and the device 100 covers substantially the entire main face of the glasses 8,8'.

The invention claimed is:

1. An electrically controllable device having scattering which is variable by liquid crystals comprising a stack of layers in this order:

- a first electrode with a first main surface forming a bonding surface and an opposite surface,
- a dielectric electroactive layer with a main face on the bonding surface side and a main opposite face, made of a material comprising:
  - liquid crystals,
  - polymers forming a polymeric network, the liquid crystals being stabilized by the polymeric network,
- a second electrode with, on the side of the opposite face of the dielectric electroactive layer, a main surface forming a second bonding surface and with an opposite surface, the electroactive layer being visible by transparency on the side of the first electrode or on the side of the second electrode, or both, wherein the material exhibits, starting from a temperature T1, a mesophase P in which the material comprises an assembly of subcentimetric domains, which comprise two-dimensional topological defects, and wherein, at a temperature T' greater than or equal to T1, the stack is capable of exhibiting at least first, second and third scattering states for at least one wavelength in the visible region, the first state being scattering and the most scattering, the second state being scattering and less scattering than the first state, and the third state being transparent or scattering and less scattering than the second state, the first, second and third states being switchable, at least two of the first, second and third states being obtained by the application of an electric field between the first and second electrodes.

2. The electrically controllable device having scattering which is variable by liquid crystals as claimed in claim 1, wherein the first state is accessible in the absence of said applied electric field, the second and third states are accessible in the presence of said applied electric field, the second state being obtained for a voltage V1 and the third state being obtained for a voltage V2 which is greater than V1.

3. The electrically controllable device having scattering which is variable by liquid crystals as claimed in claim 1, wherein, under said electric field and at temperature T', the stack exhibits a diffuse transmission or a haze, or both, which varies with the voltage in all or part between 5 and 120V.

4. The electrically controllable device having scattering which is variable by liquid crystals as claimed in claim 1, wherein the stack exhibits a total transmission TT of at least 5% at 550 nm, with a difference between a maximum total transmission and a minimum total transmission TTmax-TTmin of at most 5% from 400 to 600 nm and wherein the total transmission TT' under said electric field is such that TT'-TT (in absolute value) is less than 2% at 550 nm.

5. The electrically controllable device having scattering which is variable by liquid crystals as claimed in claim 1, wherein the mesophase P is not smectic.

6. The electrically controllable device having scattering which is variable by liquid crystals as claimed in claim 1, wherein the mesophase P exhibits a lower positional order than a mesophase P' of the material.

7. The electrically controllable device having scattering which is variable by liquid crystals as claimed in claim 1, wherein said domains of the mesophase P are domains remaining from another mesophase P'; and the mesophase P' is not nematic, and wherein the mesophase P' is smectic and defects of the mesophase P' are smectic defects.

8. The electrically controllable device having scattering which is variable by liquid crystals as claimed in claim 1, wherein said domains of the mesophase P are domains remaining from another mesophase P'.

9. The electrically controllable device having scattering which is variable by liquid crystals as claimed in claim 1, wherein the domains are comparable to focal conic domains of smectic phases.

10. The electrically controllable device having scattering which is variable by liquid crystals as claimed in claim 1, wherein the defects are line defects chosen from a regular or irregular closed contour.

11. The electrically controllable device having scattering which is variable by liquid crystals as claimed in claim 1, comprising:

in contact with the main face of the dielectric electroactive layer, a first surface anchoring layer for the liquid crystals, capable of anchoring at least a fraction of the liquid crystals in contact with this first surface anchoring layer according to a first orientation in the absence of said applied electric field, in contact with the main opposite face of the dielectric electroactive layer, a second surface anchoring layer capable of orientating a fraction of the liquid crystals in contact with the second surface anchoring layer according to a second orientation.

12. The electrically controllable device having scattering which is variable by liquid crystals as claimed in claim 11, wherein the first surface anchoring layer is a unidirectional or degenerate planar anchoring and the second surface anchoring layer is a normal or degenerate planar anchoring or the first surface anchoring layer is a dielectric layer.

13. The electrically controllable device having scattering which is variable by liquid crystals as claimed in claim 1, comprising a laminated glazing comprising:

a first glass sheet, which is optionally tinted, a thermoplastic lamination interlayer, a second glass sheet or a plastic sheet, wherein main internal faces of the first and second glass sheets face one another, the stack being between the main internal faces.

14. The electrically controllable device having scattering which is variable by liquid crystals as claimed in claim 13, wherein the glazing is laminated or is bent, or both, and is chosen from a glazing of an automobile or rail or nautical vehicle, or wherein the glazing is a glazed door, a shop window or display case, a partition, a glazed portion of street or household furniture or forms part of a double or triple glazing, or both, or wherein the electrically controllable device is used as projection or back projection screen.

15. The electrically controllable device having scattering which is variable by liquid crystals as claimed in claim 1, comprising laminated first and second glazings, and the stack is between the first and second glazings and forms a peripheral strip over an upper portion of the laminated first and second glazings, an external edge face of the stack being masked from the outside by a first opaque peripheral layer on an exterior glazing formed by one of the laminated first and second glazings, or an internal edge face of the stack being masked from the inside by a second opaque peripheral layer on the interior glazing formed by the other one of the laminated first and second glazings, or both.

16. A process for the manufacture of an electrically controllable device having scattering which is variable by liquid crystals, as claimed in claim 1, and comprising:

providing a first electrode, providing a second electrode, providing a mixture comprising:

at least one polymer precursor, liquid crystals including at least first liquid crystals exhibiting a mesophase P and optionally at least second liquid crystals, the mixture exhibiting a mesophase P and a mesophase P', TA being the temperature for transition between the mesophase P and the mesophase P' of the mixture, if necessary, a polymerization initiator, forming a stack of layers comprising, between the first and second electrodes, forming, starting from said mixture, an electroactive layer made of a material comprising said liquid crystals which are stabilized by a polymeric network, said forming comprising:

at the temperature Ti which is less than TA, in mesophase P', polymerizing said at least one precursor or precursors, resulting in said polymeric network.

17. The process for the manufacture of an electrically controllable device having scattering which is variable by liquid crystals as claimed in claim 16, wherein the first liquid crystals exhibit the mesophase P and the mesophase P', the first liquid crystals having a temperature for transition Tp between the mesophase P and the mesophase P', the polymerization is at the temperature Ti which is less than Tp or TA.

18. The process for the manufacture of the electrically controllable device having scattering which is variable by liquid crystals as claimed in claim 16, wherein the mesophase P is more distant from the crystalline phase than the mesophase P'.

19. The process for the manufacture of the electrically controllable device having scattering which is variable by liquid crystals as claimed in claim 16, comprising, in mesophase P', forming domains with two-dimensional topological defects, remaining substantially in mesophase P.

20. The process for the manufacture of the electrically controllable device having scattering which is variable by liquid crystals as claimed in claim 16, comprising, in mesophase P', forming domains:

by bringing said mixture into contact with first and second layers for anchoring the liquid crystals, by application of stresses, by application of an electric field of at most 100 Hz, the mixture comprising charged particles.

21. The process for the manufacture of the electrically controllable device having scattering which is variable by liquid crystals as claimed in claim 16, wherein the first liquid crystals have a mesophase P' which is smectic, and a nematic mesophase P and the second liquid crystals have a mesophase, and are devoid of smectic mesophase.

* * * * *